US009813842B2

United States Patent
Ahmad et al.

(10) Patent No.: US 9,813,842 B2
(45) Date of Patent: Nov. 7, 2017

(54) METHODS, APPARATUSES AND SYSTEMS DIRECTED TO PROXIMITY SERVICES (PROSE) DIRECT DISCOVERY

(71) Applicant: InterDigital Patent Holdings, Inc., Wilmington, DE (US)

(72) Inventors: Saad Ahmad, Montreal (CA); Amir Helmy, Vancouver (CA); Guanzhou Wang, Brossard (CA); Loic Canonne-Velasquez, Verdun (CA); Ulises Olvera-Hernandez, Montreal (CA); Mahmoud Watfa, Saint Leonard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/092,559

(22) Filed: Apr. 6, 2016

(65) Prior Publication Data

US 2016/0295347 A1 Oct. 6, 2016

Related U.S. Application Data

(60) Provisional application No. 62/143,681, filed on Apr. 6, 2015, provisional application No. 62/162,437, filed on May 15, 2015.

(51) Int. Cl.
*H04B 7/00* (2006.01)
*H04W 4/00* (2009.01)
*H04W 8/00* (2009.01)

(52) U.S. Cl.
CPC .......... *H04W 4/005* (2013.01); *H04W 8/005* (2013.01)

(58) Field of Classification Search
CPC . H04W 4/005; H04W 72/005; H04B 7/15507
(Continued)

(56) References Cited

U.S. PATENT DOCUMENTS

2014/0302784 A1* 10/2014 Kim ...................... H04W 8/005
455/41.2
2015/0327157 A1* 11/2015 Al-Shalash ........... H04W 48/16
370/328
(Continued)

FOREIGN PATENT DOCUMENTS

WO WO-2015/142247 9/2015

OTHER PUBLICATIONS

"3rd Generation Partnership Project; Technical Specification Group Core Network and Terminals; Proximity-services (ProSe) User Equipment (UE) to ProSe function protocol aspects; Stage 3 (Release 12)", 3GPP TS 24.334 V12.2.0, Mar. 2015, 87 pages.
(Continued)

*Primary Examiner* — April G Gonzales
(74) *Attorney, Agent, or Firm* — Youngae Kim

(57) ABSTRACT

Methods, apparatus, systems, devices, and computer program products directed to enhancements to proximity-based services (ProSe) direct discovery are provided. Among the methods is a method that may be implemented in a proximity services (ProSe) function and that may include receiving a discovery request message including a ProSe application identifier; determining whether or not the ProSe function can retrieve a valid ProSe application code corresponding to the ProSe application identifier; and transmitting a reject-type discovery response message conditioned on the determining that a valid ProSe application code is not available to the ProSe function.

36 Claims, 19 Drawing Sheets

(58) Field of Classification Search
USPC .......................................................... 455/41.2
See application file for complete search history.

(56) References Cited

U.S. PATENT DOCUMENTS

2015/0339718 A1* 11/2015 Walton ............... G06Q 30/0261
705/14.16
2015/0341794 A1* 11/2015 Vanderveen ....... G06Q 30/0261
705/14.58

OTHER PUBLICATIONS

"3rd Generation Partnership Project; Technical Specification Group Core Network and Terminals; Inter-Proximity-services (ProSe) Function signalling aspects; Stage 3 (Release 12)", 3GPP TS 29.345 V12.2.0, Mar. 2015, 46 pages.

"3rd Generation Partnership Project; Technical Specification Group Services and System Aspects; Proximity-based Services (ProSe); Security aspects (Release 12)", 3GPP TS 33.303 V12.1.0, Sep. 2014, 48 pages.

"3rd Generation Partnership Project; Technical Specification Group Services and System Aspects; Study on extended architecture support for Proximity-based services (Release 13)", 3GPP TR 23.713 V0.4.0, Feb. 2015, 67 pages.

"Addition of Match Report Refresh Timer T4006", 3GPP Tdoc C1-151102, 3GPP TSG-CT WG1 Meeting #91, Bratislava, Slovakia, Apr. 13-17, 2015, 15 pages (*date listed on http://www.3gpp.org/ftp/tsg_ct/WG1_mm-cc-sm_ex-CN1/TSGC1_91_Bratislava/docs/ is Apr. 6, 2015*).

"Addition of Match Report Refresh Timer T4006", 3GPP Tdoc C1-151342, Change Request, 3GPP TSG-CT WG1 Meeting #91, Bratislava, Slovakia, Apr. 13-17, 2015, 16 pages (*date listed on http://www.3gpp.org/ftp/tsg_ct/WG1_mm-cc-sm_ex-CN1/TSGC1_91_Bratislava/docs/ is Apr. 20, 2015*).

"Invitation to Pay Additional Fees; Partial Search Report", International Application No. PCT/US2016/026263, Jun. 9, 2016, 7 pages.

"International Search Report and Written Opinion of the International Searching Authority", International Application No. PCT/US2016/026263, Aug. 18, 2016, 20 pages.

* cited by examiner

METHODS, APPARATUSES AND SYSTEMS DIRECTED TO PROXIMITY SERVICES (PROSE) DIRECT DISCOVERY

CROSS REFERENCE TO RELATED APPLICATIONS

This application claims the benefit of U.S. Provisional Patent Application Ser. No. 62/143,681 filed 6-Apr.-2015, and U.S. Provisional Patent Application Ser. No. 62/162,437 filed 15-May-2015, each of which is incorporated herein by reference.

BACKGROUND

Field

The present disclosure relates generally to communications, and more particularly to proximity services.

Related Art

Proximity services (ProSe) enable network assisted discovery of users in close physical proximity and facilitate direct communication between those users, where and/or if appropriate. Direct communication involves a radio connection established between the users' wireless communication devices without transiting via the network. ProSe may save network resources, permit public safety communication when network coverage is unavailable, social networking, file transfer, and other services between devices.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures ("FIGs.") indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1E, where various elements of the network may utilize, perform, be arranged in accordance with and/or be adapted and/or configured for the methods, apparatuses and systems provided herein.

Figure 1A:
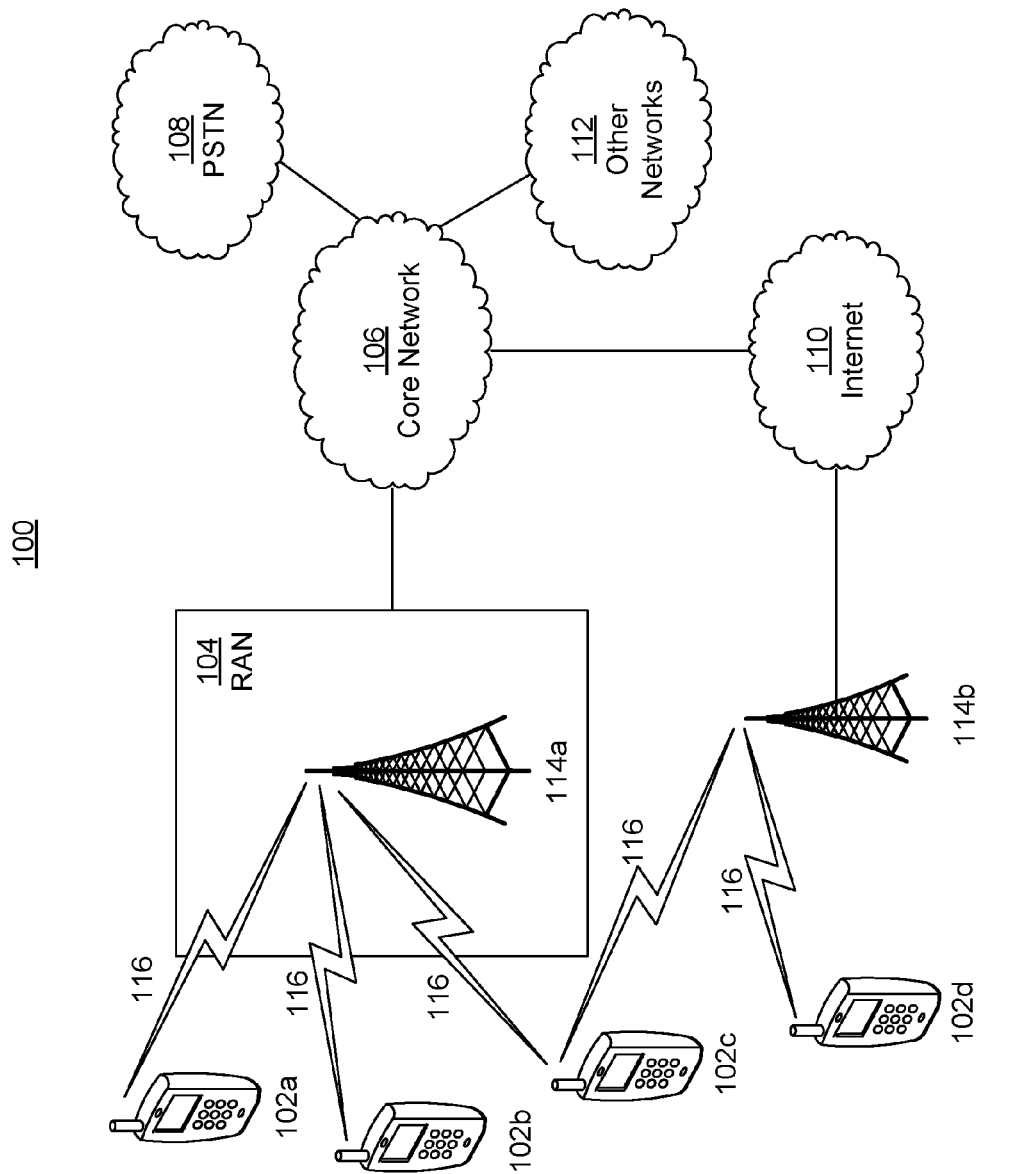
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals, and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, a terminal or like-type device capable of receiving and processing compressed video communications, or like-type device.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, a media aware network element (MANE) and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
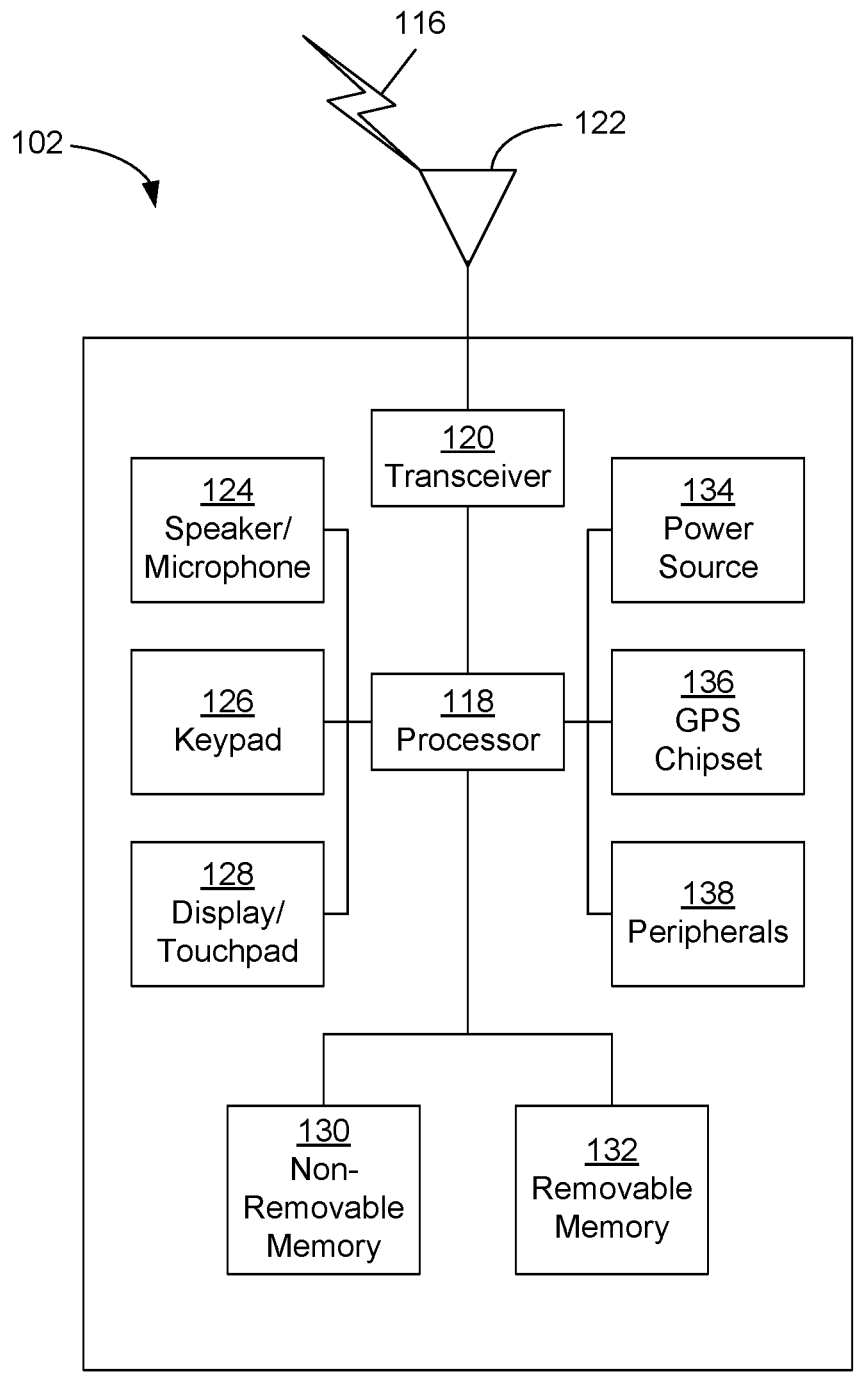
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
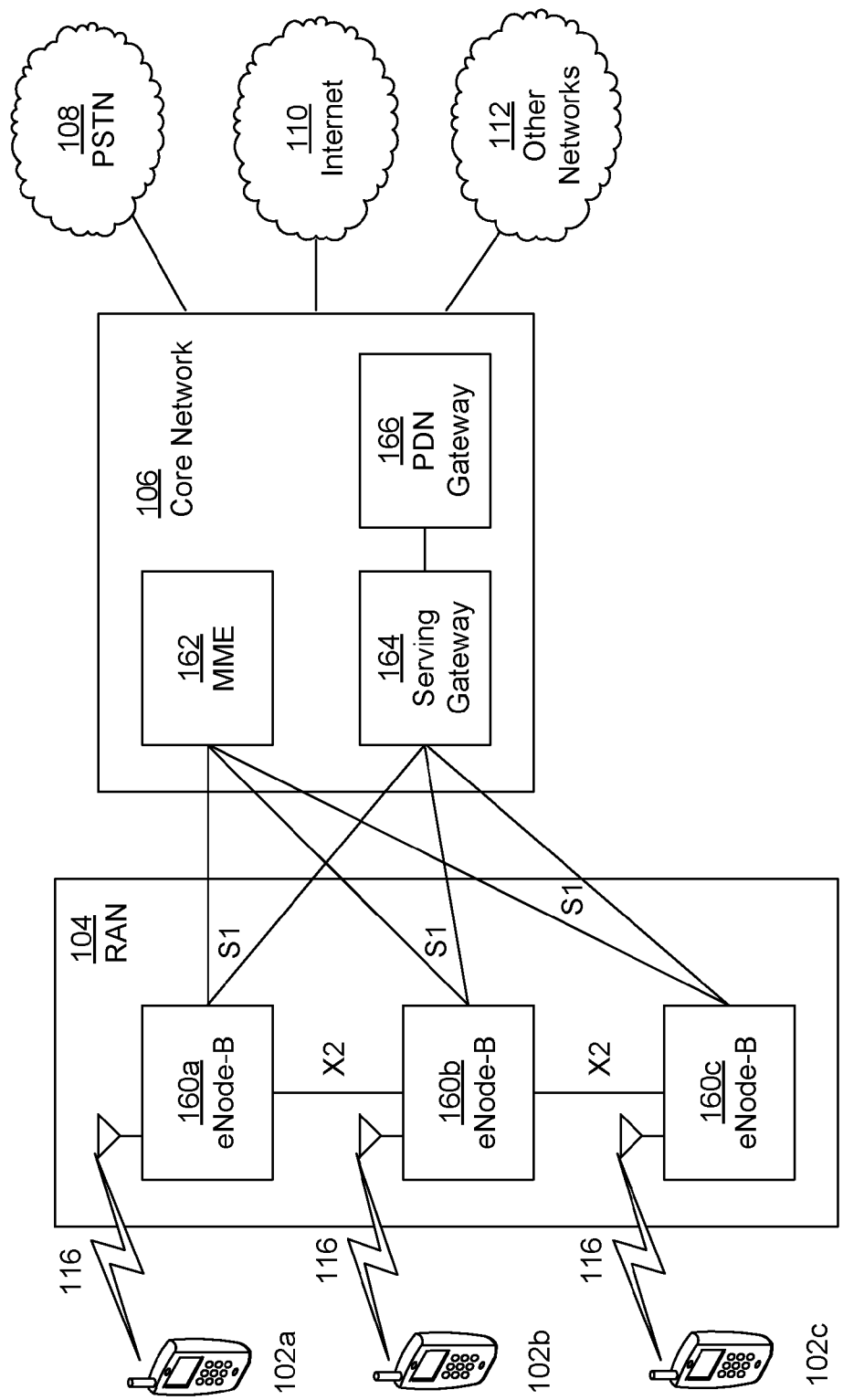
FIG. 1C is a system diagram of example radio access networks and example core networks that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

FIG. 1C is a system diagram of the RAN 104 and the core network 106 according to another embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and receive wireless signals from, the WTRU 102a.

Each of the eNode Bs 160a, 160b, 160c may be associated with a particular cell (not shown) and may be configured to handle radio resource management decisions, handover decisions, scheduling of users in the uplink and/or downlink, and the like. As shown in FIG. 1C, the eNode Bs 160a, 160b, 160c may communicate with one another over an X2 interface.

The core network 106 shown in FIG. 1C may include a mobility management gateway (MME) 162, a serving gateway (SGW) 164, and a packet data network (PDN) gateway (PGW) 166. While each of the foregoing elements are depicted as part of the core network 106, it will be appreciated that any one of these elements may be owned and/or operated by an entity other than the core network operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular SGW during an initial attach of the WTRUs 102a, 102b, 102c, and the like. The MME 162 may also provide a control plane function for switching between the RAN 104 and other RANs (not shown) that employ other radio technologies, such as GSM or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The SGW 164 may also be connected to the PGW 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
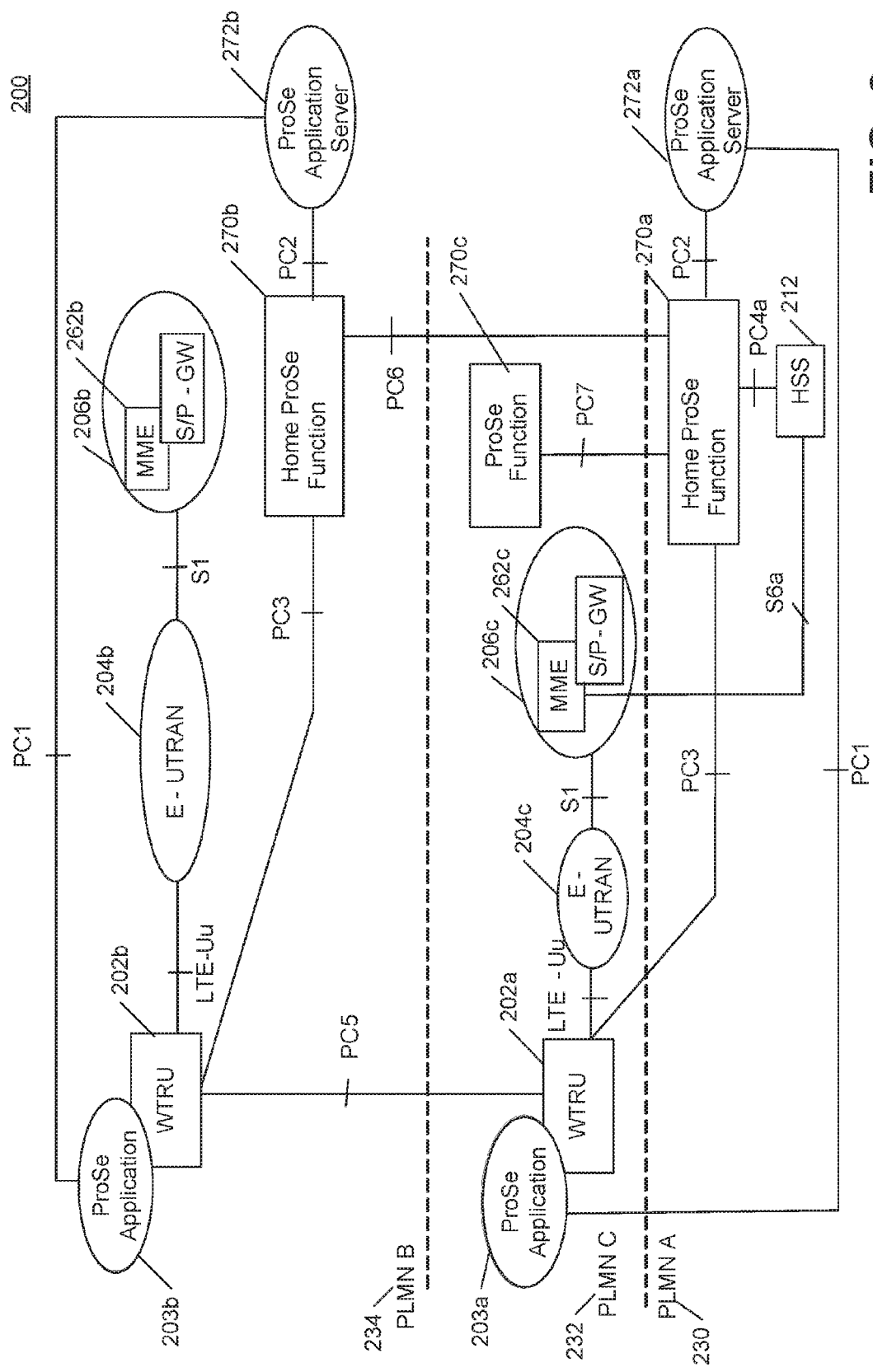
FIG. 2 is a block diagram illustrating an example proximity service (ProSe) architecture.

FIG. 2 is a block diagram illustrating an example proximity service (ProSe) architecture 200 implemented in public land mobile networks (PLMNs) 230, 232 and 234. The ProSe architecture 200 may include WTRUs 202a and 202b configured with respective ProSe applications 203a and 203b; ProSe application servers 272a and 272b; ProSe functions 270a, 270b and 270c; home subscriber server (HSS) 212; MMES 262b and 262c (which may be connected to or co-located with a respective Serving/Packet Data Network (PDN) Gateway (S/PGW)); and/or evolved UMTS Terrestrial Radio Access Networks (E-UTRANs) 204a and 204c. Each of the E-UTRANs 204a and 204c may include one or more eNode Bs (eNBs, not shown).

The ProSe architecture 200 may support various reference points, such as, for example, described in the following. PC1 may be the reference point between the ProSe application 203a or 203b (in WTRU 202a or 202b, respectively), and respective ProSe application servers 272a or 272b. The PC1 may be used to define application level signaling requirements. PC2 may be the reference point between the ProSe application server 272a or 272b and a respective ProSe function 270a or 270b. PC2 may be used to define the interaction between ProSe application server 272a or 272b and ProSe functionality (e.g. name translation) provided by the Third Generation Partnership Project (3GPP) evolved packet system (EPS) (not shown) via the respective ProSe function 270a or 270b for EPC-level ProSe discovery.

PC3 may be the reference point between the WTRU 202a and/or 202b and the ProSe functions 270a, 270b and/or 270c. PC3 may use the evolved packet core (EPC) user plane for transport (e.g., an "over IP" reference point). PC3 may be used to authorize ProSe direct discovery and EPC-level ProSe Discovery requests and may perform allocation of ProSe application codes corresponding to ProSe application identities used for ProSe direct discovery. PC3 may be used to define the authorization policy per PLMN for ProSe direct discovery (e.g. for Public Safety and non-Public Safety) and communication (e.g. for Public Safety) between WTRUs 202a and/or 202b and the ProSe functions 270a, 270b, and/or 270c.

PC4a may be the reference point between the HSS 212 and ProSe function 270b. The PC4a may be used to provide subscription information in order to authorize access for ProSe direct discovery and ProSe direct communication on a per PLMN basis. It may be used by the ProSe function 270a (e.g., EPC-level ProSe Discovery function) for retrieval of EPC-level ProSe Discovery related subscriber data. PC5 may be the reference point between WTRUs 202a and 202b and may be used for the control plane and/or user plane for ProSe direct discovery, ProSe direct communication, and/or ProSe WTRU-to-Network Relay. When the WTRU 202b is not roaming (as shown), PC6 may be the reference point between the ProSe function 270b in the home PLMN (HPLMN) 234 for the WTRU 202b and the ProSe function 270a in the PLMN 230. PC6 may be used, for example, to authorize ProSe direct discovery requests, and/or perform allocation of ProSe application identity codes and ProSe application identity names from the HPLMN 232 of the WTRU 202b. PC6 may be used for HPLMN control of ProSe service authorization.

When the WTRU 202a is roaming (as shown), PC7 may be the reference point between the ProSe function 270a in the HPLMN 230 of WTRU 202a and the ProSe function 270c in the visited PLMN (VPLMN) 230 (or alternatively, the ProSe function 270b in the PLMN 234). PC7 may be used to authorize ProSe direct discovery requests, and/or may perform allocation of ProSe application identity codes and ProSe application identity names from the HPLMN 234 for WTRU 202b. PC7 may be used for HPLMN control of ProSe service authorization.

S6a may be the reference point used to download ProSe related subscription information to MME 262 during an E-UTRAN 204 attach procedure or to inform the MME 262 that MME subscription information in the HSS 212 has changed. S1 (S1-MME) may be used in ProSe to provide an indication from the MME 262c or 262b to an eNB in the E-UTRAN 204c or 204b, respectively, that the respective WTRU 202a or 202b may be authorized to use ProSe direct discovery. The LTE-Uu interface may be used between the WTRUs 202a and 202b and the E-UTRAN 204a and 204c, respectively. The LTE-Uu interface may be used to communicate control messages between the WTRUs 202a and 202b and the LTE system and/or for transporting user plane data between the WTRUs 201 and 202 and the Internet.

The ProSe function 270 may be a network element (e.g., a logical function implemented in a network element) used for network related actions required for ProSe. The ProSe function 270 may assume different roles for different features of ProSe (each a "ProSe feature"). The ProSe function 270 may include various sub-functions that perform different roles depending on the ProSe feature. These sub-functions may include a direct provisioning function (DPF), a direct discovery name management function (DDNMF) and an EPC-level discovery ProSe function.

The DPF may be used to provision a WTRU 202 with parameters in order to use ProSe direct discovery and/or Prose direct communication. The DPF may be used to provision WTRUs with PLMN-specific parameters that allow a WTRU 202 to use ProSe in the specific PLMN. In an example, for direct communication used for Public Safety, the DPF may provision the WTRU 202 with parameters that may be used when the WTRU 202 is served by E-UTRAN.

The DDNMF may be used for open ProSe direct discovery to allocate and/or process the mapping of ProSe applications identities (IDs) and/or ProSe application codes used in ProSe direct discovery. The DDNMF may use ProSe related subscriber data stored in an HSS 212 for authorization of each discovery request. The DDNMF may also provide the WTRU 202 with security material so that the WTRU may protect discovery messages transmitted over the air.

The EPC-level Discovery ProSe function may have a reference point towards the application server 272 (e.g., reference point PC2), towards the HSS 212 (e.g., reference point PC4a) and towards the WTRU 202 (e.g., reference point PC3). The functionality of the EPC-level Discovery ProSe function may include any of the following: storage of ProSe related subscriber data and/or retrieval of ProSe-related subscriber data from the HSS 212; authorization and/or configuration of the WTRU for EPC-level ProSe Discovery and/or EPC-assisted WLAN direct discovery and communication; storage of a list of applications that may be authorized to use EPC-level ProSe Discovery and EPC-assisted WLAN direct discovery and communication; acting as a location services client (e.g. Service Location Protocol (SLP) agent) to enable EPC-level ProSe Discovery; providing the WTRU 202 with information to assist WLAN direct discovery and communications; handling of EPC ProSe Subscriber IDs and application Layer User IDs; security related functionality; interaction with WTRU 202 over PC3 reference point; interaction with third party application servers over a PC2 reference point; interaction with ProSe functions 270 in other PLMNs over a PC6 reference point; support for functionality for requesting WTRU location via the HSS 212; and/or providing functionality for charging via the EPC or outside of the EPC (e.g. offline charging). The ProSe function 270 may provide charging functionality for usage of ProSe, which may include ProSe via the EPC and/or for ProSe direct discovery and ProSe direct communication.

Example ProSe Direct Discovery Procedures

ProSe direct discovery as used herein may refer to one of various direct discovery procedures. Any of these direct discovery procedures may be based on a discovery model. Examples of the discovery model may include a Model A ("I am here") and a Model B ("who is there?"/"Are you there?").

Model A defines two roles for ProSe-enabled WTRUs (WTRUs configured with ProSe applications) that participate in ProSe direct discovery. The first role is as an announcing WTRU, and the second role is as a monitoring WTRU. Under the first role, the announcing WTRU may announce certain information that may be used by WTRUs in proximity that have permission to discover. Under the second role, the monitoring WTRU may monitor for certain information of interest while within proximity of announcing WTRUs.

The announcing WTRU may broadcast discovery messages at pre-defined discovery intervals, and the monitoring WTRUs that may be interested in these messages may read them and may process them. Model A may be considered as equivalent to "I am here" because the announcing WTRU may broadcast information about itself, e.g., its ProSe application identities or ProSe WTRU identities, in the discovery message.

Model B defines two roles for ProSe-enabled WTRUs that participate in ProSe direct discovery. The first role is as a Discoverer WTRU, and the second role is as a Discoveree WTRU. A ProSe-enabled WTRU participating under the first role as a Discoverer WTRU may request information about what it is interested to discover. A ProSe-enabled WTRU participating under the second role as a Discoveree WTRU may receive the request, and may respond with some information related to the Discoverer WTRU request.

Under Model B discovery, both Discoverer WTRU and Discoveree WTRU perform monitoring and announcing operations. The Discoverer WTRU performs an announcing operation followed by a monitoring operation, and the Discoveree WTRU performs a monitoring operation followed by an announcing operation. The Discoverer WTRU, for example, may announce a ProSe query code, and then may monitor for a ProSe response code. The Discoveree WTRU, conversely, may monitor for a ProSe query code, and then may announce a ProSe response code.

Under Model B discovery, the ProSe query code may be allocated by a ProSe function in an HPLMN of the Discoveree ("Discoveree (H)ProSe function"), and may then be passed to a ProSe function in an HPLMN of the Discoverer ("Discoverer (H)ProSe function") as part of a Discoverer WTRU request procedure. The ProSe query code may be broadcasted by the Discoverer WTRU over the air (e.g., via the PC5 interface).

The ProSe response code may be allocated and/or provided to the Discoveree WTRU by the Discoveree (H)ProSe function as part of a Discoveree WTRU request procedure. The ProSe response code may be sent by the Discoveree WTRU over the air (PC5 interface) after receiving a ProSe query code that matches a discovery filter employed by the Discoveree WTRU.

After receiving the ProSe response code from the Discoveree WTRU, a match report procedure may be initiated by the Discoverer WTRU to acquire a ProSe application ID from the Discoverer (H)ProSe function.

As one of ordinary skill in the art would recognize, both Discoverer WTRUs and monitoring WTRUs are configured to look for a service, and one may be substituted for the other in the embodiments herein without modification or with modification well within ordinary skill in the art based on (at least on) the teachings herein. Similarly, both Discoveree WTRUs and announcing WTRUs are configured to provide a service, and one may be substituted for the other in the embodiments herein without modification or with modification well within ordinary skill in the art based on (at least on) the teachings herein.

This disclosure is drawn, inter alia, to methods, apparatus, systems, devices, and computer program products directed to enhancements to proximity-based services (ProSe) direct discovery. Among the methods is a method that be implemented in a ProSe function and that may include receiving a discovery request message including a ProSe application identifier; determining whether or not the ProSe function can retrieve a valid ProSe application code corresponding to the ProSe application identifier; and transmitting a reject-type discovery response message conditioned on the determining that a valid ProSe application code is not available to the ProSe function.

Among the apparatus is a ProSe function that may include circuitry, including a processor and instructions executable by the processor, and that may be configured to receive a discovery request message including a ProSe application identifier; determine whether or not the ProSe function can retrieve a valid ProSe application code corresponding to the ProSe application identifier; and transmit a reject-type discovery response message conditioned on the determining that a valid ProSe application code is not available to the ProSe function.

Among the methods is a method that may be implemented in a WTRU participating in a ProSe direct discovery procedure, and that may include sending a match report request message to a ProSe function after expiry of a match report refresh timer and prior to expiry of a validity timer of a ProSe code; receiving a match report reject message from the ProSe function; and stopping the validity timer responsive to the match report reject message.

Among the methods is a method that may be implemented in a WTRU participating in a ProSe direct discovery procedure, and that may include sending multiple match report request messages to a ProSe function after expiry of a match report refresh timer and prior to expiry of a validity timer of a ProSe code; and stopping the validity timer on condition that the WTRU does not receive a match report acknowledgement for any of the multiple match report request messages.

In an embodiment the method may further include informing upper layers of the WTRU that the ProSe code is no longer valid. In an embodiment, the method may include sending a new match report request message after stopping the validity timer. In an embodiment, the new match report request message may be sent at a next match event. In an embodiment, the match report reject message may include a cause value indicating an invalid MIC. In an embodiment, the match report reject message is a match report acknowledgement message.

Among the apparatus is a WTRU configured to participate in a ProSe direct discovery procedure. The WTRU may include a transmitter, a receiver, a processor, a match report refresh timer and a validity timer of a ProSe code. The processor in combination with the transmitter may be configured to send a match report request message to a ProSe function after expiry of the match report refresh timer and prior to expiry of the validity timer of a ProSe code; the receiver may be configured receive a match report reject message from the ProSe function; and the processor may be configured to stop the validity timer responsive to the match report reject message.

In an embodiment, the processor in combination with the transmitter may be configured to send multiple match report request messages to a ProSe function after expiry of a match report refresh timer and prior to expiry of a validity timer of a ProSe code; and the processor may be configured to stop the validity timer on condition that a match report acknowledgement for any of the multiple match report request messages is not received by the WTRU.

In an embodiment, the processor may be configured to inform upper layers of the WTRU that the ProSe code is no longer valid. In an embodiment, the processor in combination with the transmitter may be configured to send a new match report request message after stopping the validity timer. In an embodiment, the new match report request message may be sent at a next match event. In an embodiment, the match report reject message may include a cause value indicating an invalid MIC. In an embodiment, the match report reject message may be a match report acknowledgement message.

Among the methods is a method that may be implemented in a WTRU and that may include sending a first match report request message to a ProSe function after expiry of a match report refresh timer and prior to expiry of a validity timer of a ProSe code; receiving a first match report reject message from the ProSe function; sending a second match report request message to the ProSe function after expiry of the match report refresh timer and prior to expiry of the validity timer; and receiving a match report acknowledgement for the second match report request message.

In an embodiment, the method may further include informing upper layers of the WTRU that the ProSe code is no longer valid. In an embodiment, the match report reject message nay include a cause value indicating an invalid MIC. In an embodiment, the match report reject message is a match report acknowledgement message.

Among the apparatus is a WTRU that may include a transmitter, a receiver, a processor, a match report refresh timer and a validity timer of a ProSe code. The processor in combination with the transmitter may be configured to send a first match report request message to a ProSe function after expiry of the match report refresh timer and prior to expiry of the validity timer; the receiver may be configured to receive a first match report reject message from the ProSe function; the processor in combination with the transmitter may be configured to send a second match report request message to the ProSe function after expiry of the match report refresh timer and prior to expiry of the validity timer;

and the receiver may be configured to receive a match report acknowledgement for the second match report request message.

In an embodiment, the processor may be configured to inform upper layers of the WTRU that the ProSe code is no longer valid. In an embodiment, the first match report reject message comprises a cause value indicating an invalid MIC. In an embodiment, any of the first and second match report reject messages is a match report acknowledgement message. In an embodiment, Among the methods is a method that may be implemented in a ProSe function and that may include receiving multiple match report request messages from a WTRU after expiry of a match report refresh timer and prior to expiry of a validity timer of a ProSe code; and sending, to the WTRU, a match report reject message for each of the multiple match report request messages.

In an embodiment, the method may further include receiving a new match report request message at a next match event. In an embodiment, the match report reject message may include a cause value indicating an invalid MIC. In an embodiment, the match report reject message may be a match report acknowledgement message.

Among the apparatus is a ProSe function that may include circuitry, including a processor and instructions executable by the processor, and that may be configured to receive multiple match report request messages from a WTRU after expiry of a match report refresh timer and prior to expiry of a validity timer of a ProSe code; and send, to the WTRU, a match report reject message for each of the multiple match report request messages.

In an embodiment, the circuitry may be configured to receive a new match report request message at a next match event. In an embodiment, the match report reject message may include a cause value indicating an invalid MIC. In an embodiment, the match report reject message is a match report acknowledgement message.

Among the methods is a method that may be implemented in a ProSe function and that may include receiving a first match report request message from a wireless transmit/receive WTRU after expiry of a match report refresh timer and prior to expiry of a validity timer of a ProSe code; sending a first match report reject message to the WTRU; receiving a second match report request message from the WTRU after expiry of the match report refresh timer and prior to expiry of the validity timer; and sending a match report acknowledgement for the second match report request message.

In an embodiment, the first match report reject message may include a cause value indicating an invalid MIC. In an embodiment, any of the first and second match report reject messages may be a match report acknowledgement message.

Among the apparatus is a ProSe function that may include circuitry, including a processor and instructions executable by the processor, and that may be configured to receive a first match report request message from a wireless transmit/receive WTRU after expiry of a match report refresh timer and prior to expiry of a validity timer of a ProSe code; send a first match report reject message to the WTRU; receive a second match report request message from the WTRU after expiry of the match report refresh timer and prior to expiry of the validity timer; and send a match report acknowledgement for the second match report request message.

In an embodiment, the first match report reject message may include a cause value indicating an invalid MIC. In an embodiment, any of the first and second match report reject messages is a match report acknowledgement message.

Among the methods is a method implemented in a Discoverer WTRU participating in a ProSe direct discovery procedure. The method may include transmitting a first discovery message including a metadata flag that signals a desire to obtain metadata from a Discoveree WTRU participating in the ProSe direct discovery procedure. The method may include receiving, from the Discoveree WTRU, a second discovery message including the metadata.

Also among the methods is a method implemented in a Discoveree WTRU participating in a ProSe direct discovery procedure. The method may include receiving, from a Discoverer WTRU participating in the ProSe direct discovery procedure, a first discovery message including a metadata flag that signals a desire to obtain metadata from the Discoveree WTRU. The method may also include transmitting, to the Discoverer WTRU, a second discovery message including the metadata.

In an embodiment, the first discovery message may include a ProSe query code. In an embodiment, the second discovery message may include a ProSe response code. In an embodiment, any of the first and second discovery messages may be communicated using respective PC5 reference points of the Discoverer WTRU and the Discoveree WTRU. In an embodiment, the metadata is transmitted between the first and second WTRUs via an air interface.

Another of the methods may be a method implemented in a ProSe function associated with a Discoveree WTRU participating in a ProSe direct discovery procedure. The method may include receiving, from the Discoveree WTRU, a first discovery message including metadata associated with Discoveree WTRU; and transmitting, to a ProSe function associated with a Discoverer WTRU participating in the ProSe direct discovery procedure, a second discovery message including the metadata associated with the Discoveree WTRU.

In an embodiment, the method may include storing the metadata associated with the Discoveree WTRU. In an embodiment, the method may include extracting the metadata from storage. In an embodiment, the first discovery message may include a command field set to ProSe response. In an embodiment, the second discovery message may include any of a ProSe query code and a ProSe response code.

Another of the methods may be a method implemented in a ProSe function associated with a Discoverer WTRU participating in a ProSe direct discovery procedure. The method may include receiving, from a ProSe function associated with a Discoveree WTRU participating in the ProSe direct discovery procedure, a discovery message including metadata associated with the Discoveree WTRU; receiving, from the Discoverer WTRU, a match report message including a metadata flag signaling a desire to obtain metadata associated with a Discoveree WTRU; and transmitting, to the Discoverer WTRU, a match report acknowledgement message including the metadata associated with the Discoveree WTRU.

In an embodiment, the method may include storing the metadata associated with the Discoveree WTRU. In an embodiment, the method may include extracting the metadata from storage. In an embodiment, the first discovery message may include a command field set to ProSe response. In an embodiment, the second discovery message may include any of a ProSe query code and a ProSe response code.

Another of the methods may be a method implemented in a ProSe function associated with a Discoveree WTRU participating in a ProSe direct discovery procedure. The method may include receiving, from the Discoveree WTRU, a first discovery message including a metadata flag signaling a desire to obtain metadata associated with a Discoverer WTRU participating in the ProSe direct discovery procedure; and transmitting, to a ProSe function associated with the Discoverer WTRU, a second discovery message including the metadata flag.

In an embodiment, the first discovery message may include a command field set to ProSe response. In an embodiment, the second discovery message may include any of a ProSe query code and a ProSe response code. In an embodiment, the method may further include receiving, from the ProSe function associated with the Discoverer WTRU, a match report message including metadata associated with the Discoverer WTRU. In an embodiment, the method may further include transmitting, to the Discoveree WTRU, a match report message including the metadata associated with the Discoverer WTRU.

Another of the methods may be a method implemented in a ProSe function associated with a Discoverer WTRU wireless participating in a ProSe direct discovery procedure. The method may include receiving, from a ProSe function associated with a Discoveree WTRU participating in the ProSe direct discovery procedure, a first discovery message including a metadata flag signaling a desire to obtain metadata associated with a Discoverer WTRU; and transmitting, to the Discoverer WTRU, a second discovery message including the metadata flag.

In an embodiment, any of the first and second discovery messages may include a ProSe query code. In an embodiment, any of the first and second discovery messages may be communicated using respective PC5 reference points of the Discoverer WTRU and the Discoveree WTRU. In an embodiment, the metadata may be transmitted between the first and second WTRUs via an air interface.

Another of the methods may be a method implemented a Discoverer WTRU participating in a ProSe direct discovery procedure. The method may include receiving, from a ProSe function associated with the Discoverer WTRU, a first discovery message including a metadata flag signaling a desire to obtain metadata associated with the Discoverer WTRU; and transmitting, to a Discoveree WTRU participating in the ProSe direct discovery procedure, a second discovery message including the metadata associated with the Discoverer WTRU.

In an embodiment, the first discovery message may include a command field set to ProSe response. In an embodiment, the second discovery message may include a ProSe query code. In an embodiment, the second discovery message may be communicated using respective PC5 reference points of the Discoverer WTRU and the Discoveree WTRU. In an embodiment, the metadata is transmitted between the first and second WTRUs via an air interface.

Another of the methods may be a method implemented in a Discoveree WTRU participating in a ProSe direct discovery procedure. The method may include transmitting, to a ProSe function associated with the Discoveree WTRU, a first discovery message including a metadata flag signaling a desire to obtain metadata associated with the Discoverer WTRU; and receiving, from a Discoverer WTRU participating in the ProSe direct discovery procedure, a second discovery message including the metadata associated with the Discoverer WTRU.

In an embodiment, the discovery message may include a ProSe response code. In an embodiment, the discovery message may be communicated using respective PC5 reference points of the Discoverer WTRU and the Discoveree WTRU.

Another of the methods may be a method implemented in a Discoveree WTRU participating in a ProSe direct discovery procedure. The method may include transmitting, to a Discoverer WTRU participating in the ProSe direct discovery procedure, a discovery message including a metadata flag signaling a desire to obtain metadata associated with the Discoverer WTRU; receiving, from a ProSe function associated with the Discoveree WTRU, a match report message including the metadata associated with the Discoverer WTRU.

Another of the methods may be a method implemented in a ProSe function associated with a Discoveree WTRU participating in a ProSe direct discovery procedure. The method may include receiving, from a ProSe function associated with a Discoverer WTRU participating in the ProSe direct discovery procedure, a first match report message including metadata associated with the Discoverer WTRU; transmitting, to the Discoveree WTRU, a second match report message including the metadata associated with the Discoverer WTRU.

Another of the methods may be a method implemented in a ProSe function associated with a Discoverer WTRU participating in a ProSe direct discovery procedure. The method may include receiving, from the Discoverer WTRU, a first match report message including metadata associated with the Discoverer WTRU; and transmitting, to a ProSe function associated with a Discoveree WTRU participating in a ProSe direct discovery procedure, a second match report message including the metadata associated with the Discoverer WTRU.

Another of the methods may be a method implemented in a ProSe function associated with a Discoveree WTRU participating in a ProSe direct discovery procedure. The method may include receiving, from the Discoveree WTRU, a first discovery message including information corresponding to a ProSe code suffix; transmitting, to a ProSe application server, a first authentication message including the information corresponding to a ProSe code suffix; receiving, from the ProSe application server, a second authentication message including a ProSe code suffix pool and one or more ProSe code suffix masks; and transmitting, to the Discoveree WTRU, a second discovery message including the ProSe code suffix pool.

Another of the methods may be a method implemented in a Discoveree WTRU participating in a ProSe direct discovery procedure. The method may include transmitting, to a ProSe function associated with the Discoveree WTRU, a first discovery message including information corresponding to a ProSe code suffix; and receiving, from the ProSe function associated with the Discoveree WTRU, a ProSe application server, a second discovery message including the ProSe code suffix pool.

Another of the methods may be a method implemented in a ProSe function associated with a Discoverer WTRU participating in a ProSe direct discovery procedure. The method may include receiving, from the Discoveree WTRU, a first discovery message including information corresponding to a ProSe code suffix; transmitting, to a ProSe application server, a first authentication message including the information corresponding to a ProSe code suffix; receiving, from the ProSe application server, a second authentication message including a ProSe code suffix pool and one or more ProSe code suffix masks; transmitting, to a ProSe function associated with a Discoveree WTRU participating in the ProSe direct discovery procedure, a discovery request message; receiving, from the ProSe associated with a Discoveree WTRU, a discovery response message including a ProSe code suffix pool; and transmitting, to the Discoverer WTRU, a second discovery message including the ProSe code suffix pool.

Another of the methods may be a method implemented in a Discoverer WTRU participating in a ProSe direct discovery procedure. The method may include transmitting, to a ProSe function associated with the Discoverer WTRU, a first discovery message including information corresponding to a ProSe code suffix; receiving, from the ProSe function associated with the Discoveree WTRU, a second discovery message including the ProSe code suffix pool.

In an embodiment of the preceding methods and/or apparatuses, the ProSe direct discovery procedure may be any of a Model A direct discovery procedure and a ProSe Model B direct discovery procedure.

Figure 3:
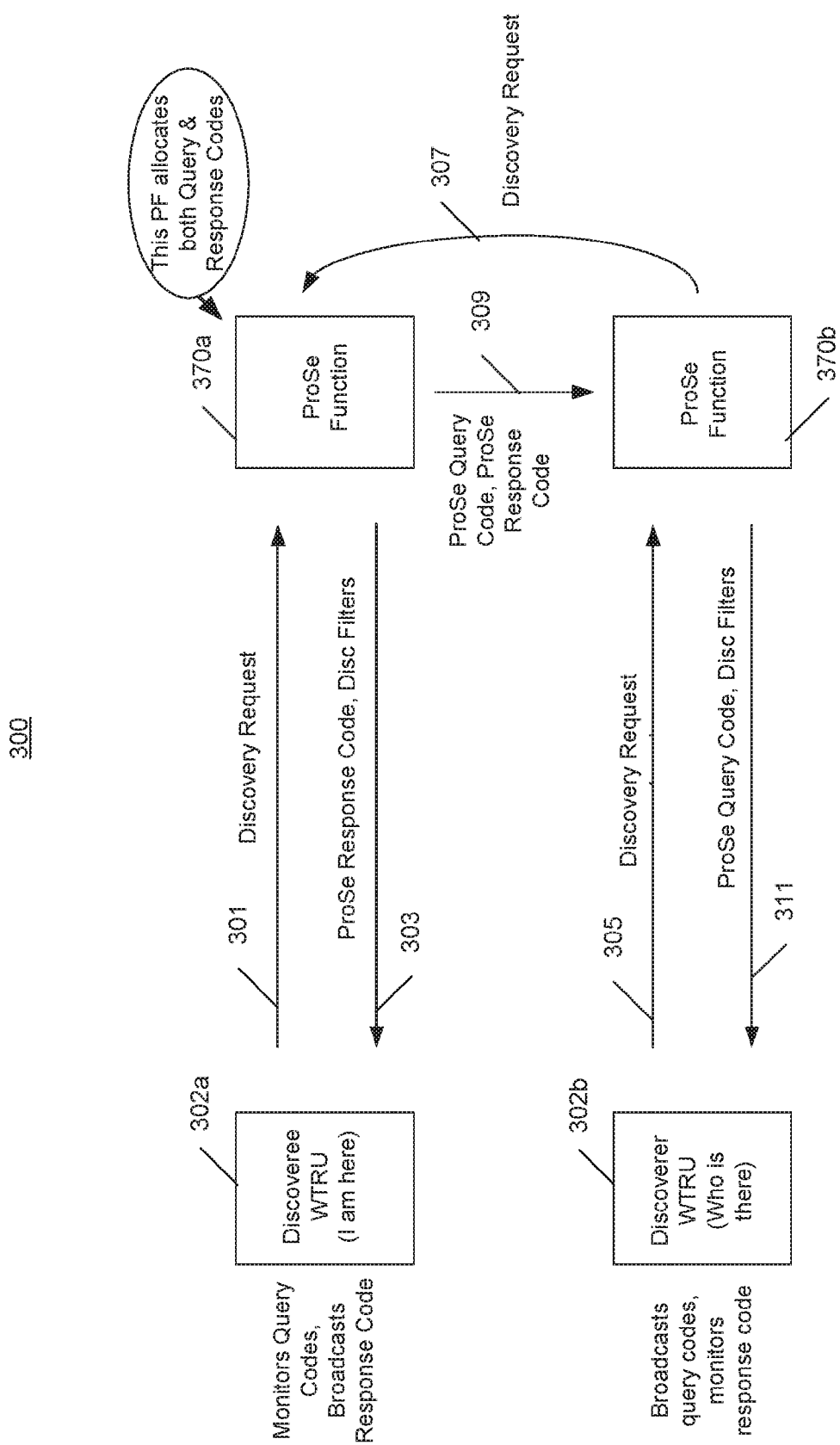
FIG. 3 is a flow diagram illustrating an example ProSe Model B direct discovery procedure.

Referring now to FIG. 3, a flow diagram illustrating an example ProSe Model B direct discovery procedure 300 is shown. The ProSe Model B direct discovery procedure 300 may be carried out by a Discoveree WTRU 302a, a Discoveree ProSe function 370a, a Discoverer WTRU 302b and a Discoverer ProSe function 370b. The ProSe Model B direct discovery procedure 300 may be carried out in three phases, namely, a Discoveree WTRU request procedure, a Discoverer WTRU request procedure and a direct-communication discovery procedure between Discoveree WTRU 302a and the Discoverer WTRU 302b.

The Discoveree WTRU request procedure may be carried out as follows. The Discoveree WTRU 302a may send a discovery request message 301 to the Discoveree ProSe function 370a. After receiving the discovery request message 301, the Discoveree ProSe function 370a may allocate a ProSe response code, the ProSe query code and one or more discovery filters (corresponding to the ProSe query code). The Discoveree ProSe function 370a may send a discovery response message 303 to the Discoveree WTRU 302a. The discovery response message 303 may include the allocated ProSe response code and discovery filters. After receiving the discovery response message 303, the Discoveree WTRU 302a may extract the allocated ProSe response code and discovery filters and may begin monitoring for ProSe query codes matching the allocated discovery filters.

The Discoverer WTRU request procedure may be carried out as follows. The Discoverer WTRU 302b may send a discovery request message 305 to the Discoverer ProSe function 370b. Thereafter, the Discoverer ProSe function 370b may interact with the Discoveree ProSe function 370a to obtain therefrom the allocated ProSe query and response codes (as both of codes were allocated by the Discoveree ProSe function 370a as part of the Discoveree WTRU request procedure). To facilitate the exchange, the Discoverer ProSe function 370b may send a discovery request message 307 to the Discoveree ProSe function 370a. The Discoveree ProSe function 370a may send a discovery response message 309 to the Discoverer ProSe function 370b. The discovery response message 309 may include the ProSe query and response codes.

After receiving the ProSe query and response codes, the Discoverer ProSe function 370b may generate one or more discovery filters based on the received ProSe response code. For each ProSe query code, the Discoverer ProSe function 370b may generate one or more discovery filters based on the received ProSe response code so that the Discoverer WTRU 302b can monitor and determine the ProSe response code that matches the discovery filter(s). The Discoverer ProSe function 370b may send a discovery response message 311 to the Discoverer WTRU 302b. The discovery response message 311 may include the ProSe query code and the discovery filters. The Discoverer WTRU 302b may receive the discovery response message 311, extract the allocated ProSe query code and discovery filters.

The direct-communication discovery procedure be carried out as follows. The Discoverer WTRU 302b may broadcast (announce) the ProSe query code, and may begin monitoring for ProSe response codes corresponding to the broadcast ProSe query code. The Discoveree WTRU 302a may respond to the broadcasted ProSe query code by sending (announcing) to the Discoverer WTRU 302b the ProSe response code it received from the Discoveree ProSe function 370b. Thereafter, the Discoverer WTRU 302b may carry out a ProSe match report procedure.

In the description of the ProSe Model B direct discovery procedure 300 above, the Discoveree WTRU request procedure is carried out first, the Discoverer WTRU request procedure is carried out next, followed by the direct-communication discovery procedure. Pursuant to the methodologies and technologies provided herein, the Discoverer WTRU may make a discovery request before the Discoveree WTRU makes a discovery request notwithstanding the possibility that, when the discovery request is received from the Discoverer WTRU, a valid ProSe code of a target ProSe application user might not be available in the ProSe functions because the target application user (Discoveree WTRU) has yet to initiate a discovery request. This may be particularly beneficial in view of using ProSe Model B direct discovery procedure for the public safety users/groups.

Figure 4:
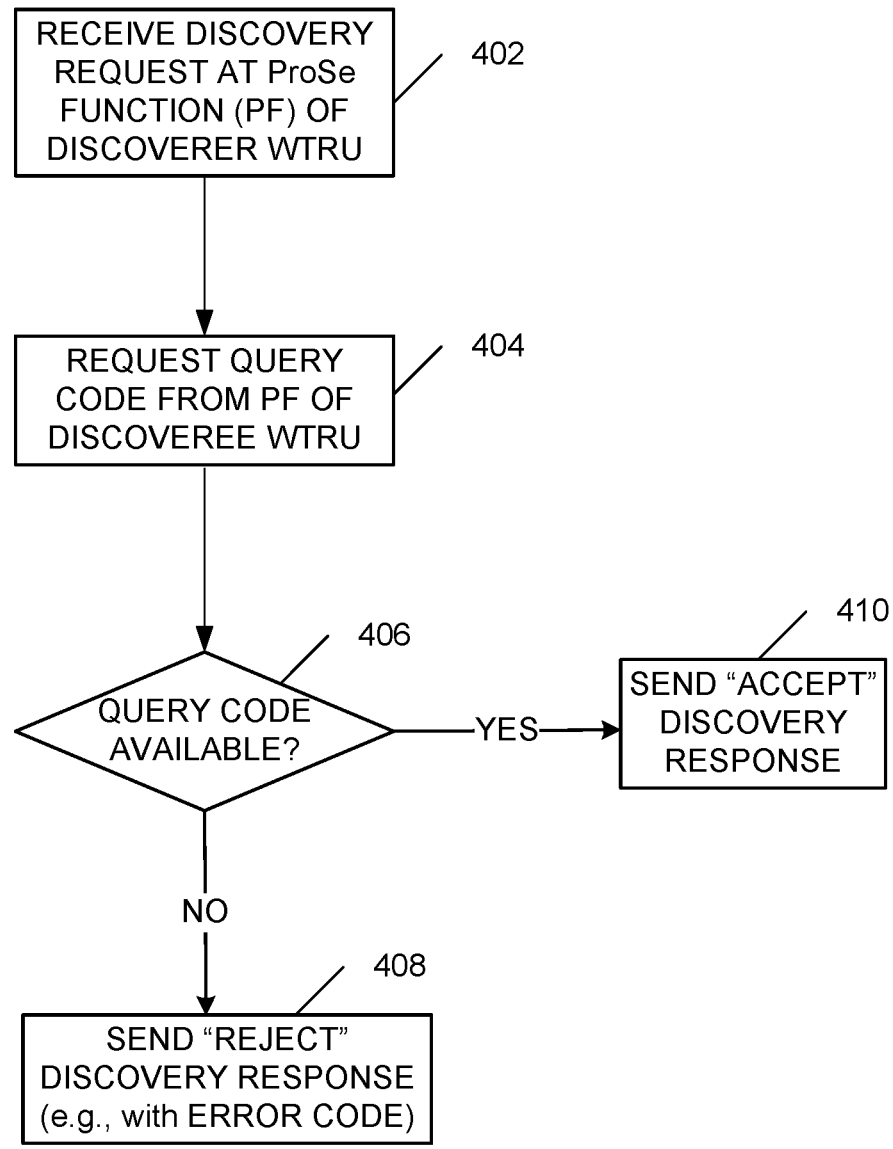
FIG. 4 is a flow diagram illustrating an example procedure in accordance with one or more embodiments.

FIG. 4 is a flow diagram illustrating an example procedure 400. For simplicity of exposition, the procedure 400 is described with respect to the Model B direct discovery procedure 300 of FIG. 3. The Discoverer ProSe function 370b may receive a discovery request message from the Discoverer WTRU 302b (402). Responsive to the discovery request message, the Discoverer ProSe function 370b may request a ProSe query code from the Discoveree ProSe function 370a (404). The Discoveree ProSe function 370a may determine whether the ProSe query code is retrievable or otherwise available (406). If the ProSe query code is retrievable or otherwise available, then the Discoveree ProSe function 370a may send an accept-type discovery response message to the Discoverer ProSe function 370a (408). If the ProSe query code is not retrievable or otherwise available, then the Discoveree ProSe function 370a may send a reject-type discovery response message to the Discoverer ProSe function 370a (410). The reject-type discovery message may include an appropriate cause indication/value (e.g., an indication of "No valid Discovery Filters" and/or "No valid ProSe code available"). Although not shown, the Discoverer ProSe function 370a may send a reject-type discovery response message to the Discoverer 302b. This reject-type discovery message may include an appropriate cause indication/value, (e.g., an indication of "No valid Discovery Filters" and/or "No valid ProSe code available), as well.

In an embodiment, when a ProSe function receives a discovery request from a Discoverer WTRU and fails to retrieve a ProSe code of a target ProSe application user, the ProSe function may initiate a announce request to a ProSe application server indicating that a discovery request towards the user has been issued and that an announcing procedure may be initiated by the target user.

To facilitate the announce request, a discovery trigger message from the ProSe function to the ProSe application server over PC2 interface may be used. The discovery trigger message may include a Target Restricted Prose App User ID, a Discoverer UE's Restricted Prose App User ID, and Request Type (=e.g., "Model B Discovery").

Upon receiving the discovery trigger message from the ProSe function, the ProSe application server may use application layer signaling (e.g., over a PC1 interface) to inform the target user that there's discovery interest towards it and announcing may be required. The ProSe application server may also translate the Discoverer restricted Prose App User ID into an application User ID and may send it to the target user. The target user may use such other another application User ID to determine who is interested in discovering the target user and, in turn, as a factor in deciding whether to accept the request or not.

If the target user accepts the request, the target user may initiate a discovery request procedure. The target user may also confirm with the ProSe application server that it has started the discovery request procedure. The ProSe application server may send a response message to the Discoverer ProSe function to inform that the target user has started announcing. The ProSe application server may send the ProSe query code and ProSe response code to the Discoverer ProSe function.

Alternatively, after receiving the confirmation from the ProSe application server, the ProSe function may return a Discovery response to the Discoverer that the target user is not available at present but it should retry later. In some embodiment, a timer may be included in the message to indicate a period of time to wait before a retry.

In another embodiment, when the ProSe application server receives the discovery trigger and the ProSe application server maintains a binding between a Target Restricted ProSe application ID and a target restricted ProSe discovery WTRU ID, which may be available because the announcing procedure of the target user was carried out before, the ProSe application server may be able to identify the target user ProSe function so it may trigger the announcing procedure by forwarding the request message to the ProSe function and then the target user ProSe function may use PC3 signaling to inform the target user to start the announcing procedure.

In an embodiment, a Discoveree ProSe function, after receiving discovery request message from a Discoverer, may trigger a discovery request over PC3 directly without going through a ProSe application server. The PC3 message may include one or more of the parameters described above in connection with the discovery trigger to the ProSe application server. The Discoveree may then start a discovery request procedure. After this procedure is complete, the Discoveree ProSe function may reply back the Discoverer ProSe function with a Discovery response message that may include the ProSe query code and ProSe response code.

In an embodiment, if a Discoverer WTRU sends a discovery request before a Discoveree WTRU, the request may be rejected by the Discoverer (H)ProSe function, when it does not receive any codes (ProSe query code and ProSe response code) from Discoveree ProSe function. The Discoverer ProSe function may send a discovery response without codes acknowledging the receipt of the discovery request message. The ProSe query code and discovery filters may be pushed on to the Discoverer WTRU when the Discoverer WTRU registers. The registration may operate as a trigger to the Discoveree ProSe function to send the codes to the Discoverer ProSe function.

In an embodiment, when a Discoverer ProSe function sends a discovery request to a Discoveree ProSe function, the Discoveree ProSe function may generate the codes and send them in a Discovery response message to the Discoverer ProSe function. The ProSe query code and discovery filter may be sent to the Discoverer WTRU with an indication to not announce the code until the Discoveree WTRU sends a discovery request. After the Discoveree WTRU sends the discovery request, the Discoveree ProSe function may send a different indication to the Discoveree ProSe function suggesting that the codes have been assigned to the Discoveree WTRU. In turn, the Discoveree ProSe function may inform the Discoverer WTRU to start broadcasting/announcing ProSe query code.

In an embodiment, an inter-ProSe information exchange may be triggered by a Discoveree WTRU after it transmits and receives confirmation of a Discovery Request (Model=B, Discovery Type, Restricted ProSe App User ID, WTRU/UE ID, command=ProSe response, application ID) message. This situation may occur whenever the Discoveree WTRU changes its discovery parameters before the validity timer expires. The Discoveree ProSe function may be able to contact other ProSe functions which had previously received ProSe query codes to exchange discovery information and keep them up to date.

Figure 5:
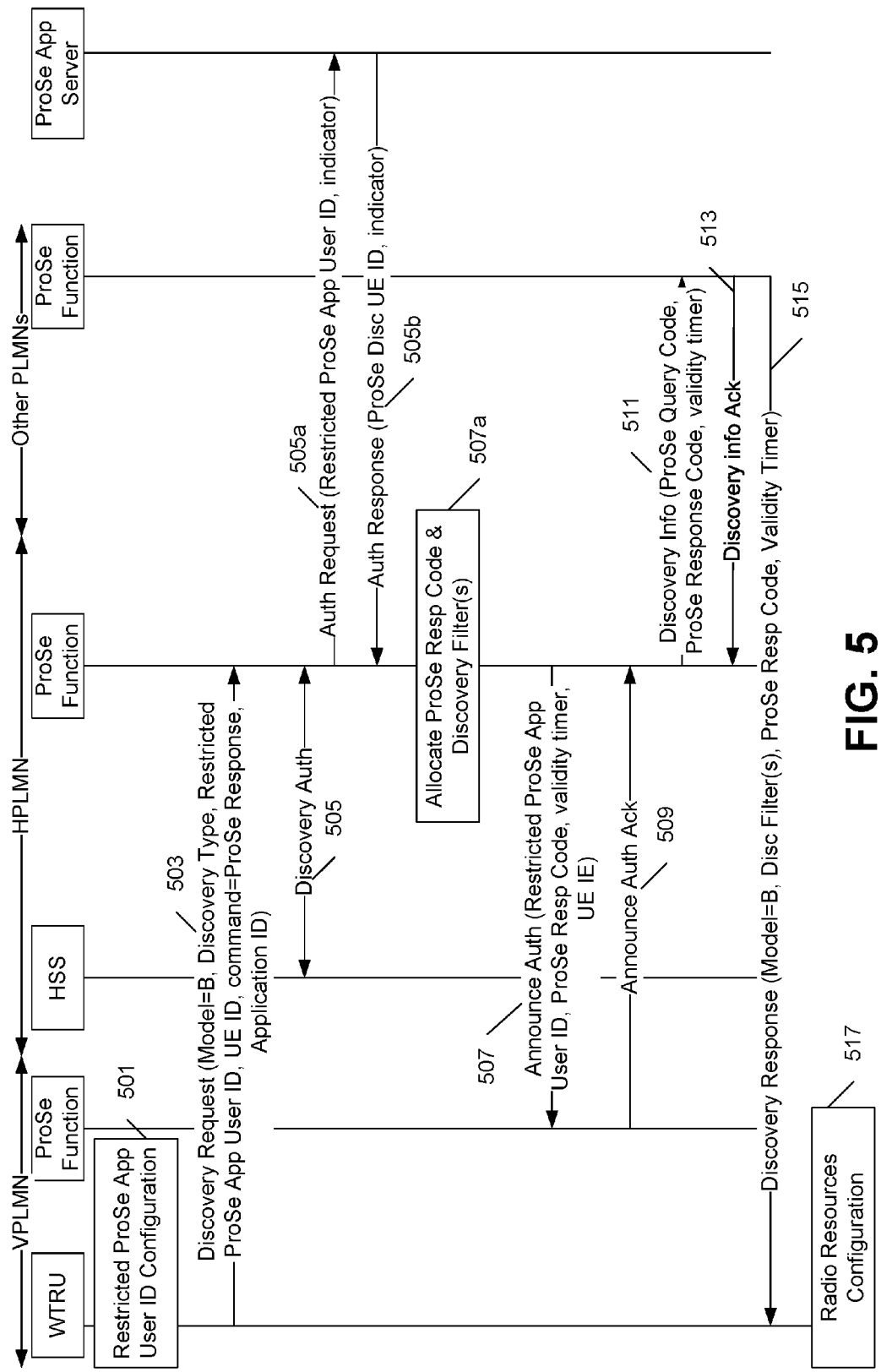
FIG. 5 is a message flow diagram illustrating an example procedure for carrying out an inter-ProSe function information transfer.

Interaction between a Discoverer ProSe function and Discoveree ProSe function (refs. 511 and 513) of FIG. 5 may be part of a discovery request procedure for a Discoveree WTRU. A ProSe query code and ProSe response code may be sent the Discoverer ProSe function as part of the Discoveree WTRU discovery request procedure. In this way, the Discoverer ProSe function may be kept up to date with the ProSe codes.

An alternative procedure to prevent outdated discovery filters and query codes may be carried out by independently setting the durations of validity timers at the Discoverer WTRU from the length of validity timers at the Discoveree WTRU. The validity timer may be set up to be shorter for the discovery filters and ProSe query codes at the Discoverer WTRU. Once the validity timer expires for the query code, a trigger may be configured at the WTRU so that it may send a new Discovery Request (Model=B, Discovery Type, Restricted ProSe App User ID, WTRU/UE ID, command=ProSe query, application ID, application Transparent Container) message to receive the latest parameters. The period of time during which it is using outdated discovery filters may be reduced because the Discoverer ProSe function may perform regular updates more frequently with the Discoveree ProSe function that assigned the query code. The length of the validity timer for the Discoverer parameters may be shorter than for the Discoveree parameters.

Due to mobility of the WTRUs, the Discoveree WTRU may change locations after having been configured for discovery. Pursuant to the new methodologies and technologies herein, the Discoverer ProSe function may be kept up to date with changes in the parameters (e.g. ProSe query code and discovery filters) for discovery when the Discoveree PLMN changes and/or when the ProSe response code is not no longer being broadcasted (e.g., because Discoverer WTRU is not authorized by a VPLMN ProSe function). Pursuant to the new methodologies and technologies herein, the discovery filter at the Discoverer WTRU for the ProSe response code may be prevented from becoming obsolete when the Discoveree changes PLMNs.

Metadata Composition and Granularity Example

The metadata associated with a user may include a wide variety of components and information types. Examples of such information may include one or more of a postal address, a phone number, a URL, a location, service characteristics/attributes, and other application specific data. In some embodiments, the Discoverer and/or Discoveree may be interested to learn about only certain components of the metadata, instead of an entire comprehensive metadata container with most or all of its associated components and/or information types. Mechanisms provided herein allow for fine metadata granularity in such instances, and as such, save network resources that would have otherwise been wasted if the entire comprehensive metadata container is instead provided.

ProSe Code Application Suffix Example

In Model A restricted discovery, ProSe code may contain an application controlled extension, which is assigned by the application server. The complete ProSe code broadcasted by the announcing WTRU may include (i) a prefix that is assigned by a ProSe function of an HPLMN of the announcing WTRU, and (ii) a ProSe code suffix that is application controlled. The ProSe code suffix may represent application specific information (e.g., a group ID, etc.). Support for ProSe code prefix and ProSe code suffix functionality in the Model B discovery procedure may be beneficial. Mechanisms provided herein allow for appropriate and unambiguous ProSe code prefix and/or suffix assignment, use and other support.

Example Procedures for Metadata Transfers to Discoverer WTRUs

Given that Model B direct discovery is a two-way discovery where the Discoverer WTRU and the Discoveree WTRU can directly exchange a ProSe query code and a ProSe response code, the Model B direct discovery procedure (and its back and forth interaction) offers another dimension or plane for transporting the metadata between the Discoveree WTRU and Discoverer WTRU upon demand.

In some embodiments, the Discoveree WTRU may be interested in obtaining metadata associated with a Discoverer WTRU. As an example, a taxi driver offering a taxi service may want to learn about a customer's desired destination address so as to allow the taxi driver to filter only those customers whose target destinations are of interest to the driver. The two-way nature of Model B discovery, with both the Discoveree WTRU and Discoverer WTRU performing monitoring and announcing operations, may be exploited to enable the Discoveree WTRU to obtain application-level information (metadata) related to Discoverer WTRUs, and in turn, consider such information in connection with determining which Discoverer WTRUs to select and/or whether to select a particular Discoverer WTRU.

Example Discoveree-to-Discoverer Direct Metadata Transfers

Figure 6:
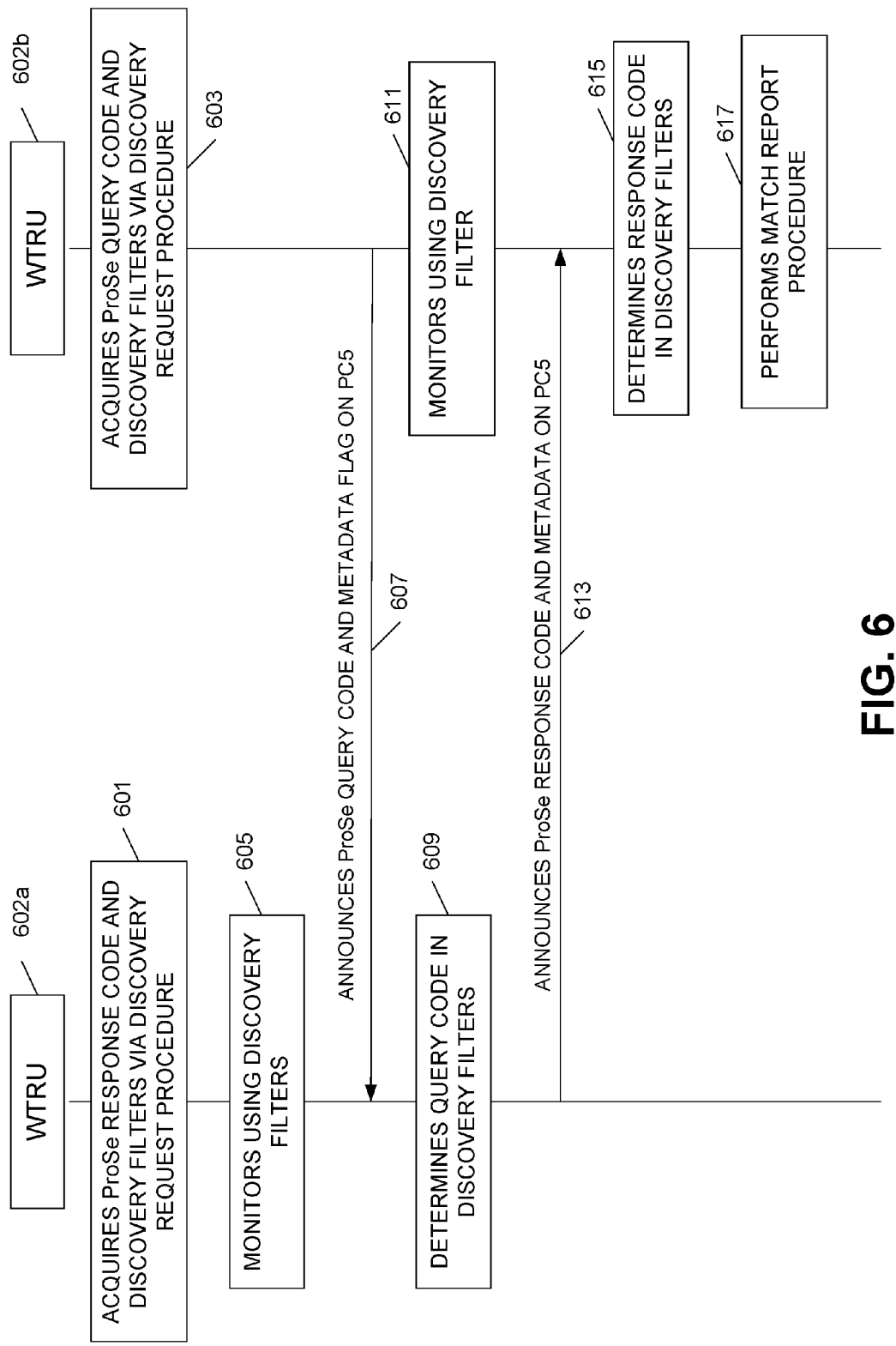
FIG. 6 is a message flow diagram illustrating an example metadata transfer procedure.

FIG. 6 is a message flow diagram illustrating an example metadata transfer procedure 600 that may be carried out during a direct-communication discovery phase of a ProSe direct discovery procedure. A Discoveree WTRU 602a may acquire a ProSe response code and discovery filters allocated by a ProSe function (not shown) responsive to carrying out a Discoveree WTRU discovery request procedure (601). The Discoverer WTRU 602b may acquire a ProSe query code and discovery filters allocated by the ProSe function responsive to carrying out a Discoverer WTRU discovery request procedure (603).

After acquiring the allocated ProSe query code and discovery filters, a discovery message 605 from the Discoverer WTRU 602b may be broadcasted or otherwise wirelessly transmitted (e.g., broadcasted) over the air. The discovery message 605 may be transmitted on a PC5, for example. The discovery message 605 may include the acquired ProSe query code. The discovery message 605 may also include a flag or other indication (collectively "metadata flag") that signals a desire to obtain metadata from a WTRU participating in direct discovery. The WTRU participating in the direct discovery may be the (yet to be) discovered Discoveree WTRU 602a. While monitoring for discovery messages using its discovery filters (605), the Discoveree WTRU 602a may detect the discovery message 605. Recognizing that the ProSe query code in the discovery message 605 is appropriate to respond to (609), and that such message includes the metadata flag, the Discoveree WTRU 602a may forward the metadata together with the ProSe response code to the Discoverer WTRU 602b over the air in a discovery message 613 (e.g., on the PC5).

While monitoring for discovery messages using its discovery filters (611), the Discoverer WTRU 602b may detect the discovery message 613. Recognizing that the ProSe response code in the discovery message 613 matches its discovery filters (615), the Discoverer WTRU 602b may extract the metadata and use it as criteria in connection with performing a match report procedure (617).

Because the WTRUs 602a, 602b can continue to announce their query/response codes prior to expiry of their corresponding validity timers, the foregoing procedure may permit the Discoveree WTRU 602a to dynamically revise, update, replace, delete, remove, etc. the metadata at any time before expiration of its validity timer. Additionally, the Discoverer WTRU 602b may decide (at some point) that it does not desire to continue acquiring metadata. To effect this, the Discoverer WTRU 602b may exclude the metadata flag in a corresponding discovery message. Alternatively, the Discoverer WTRU 602b may set the metadata flag to a value indicating a desire not to acquire the metadata.

Example Inter-ProSe Function Metadata Transfer

Figure 7:
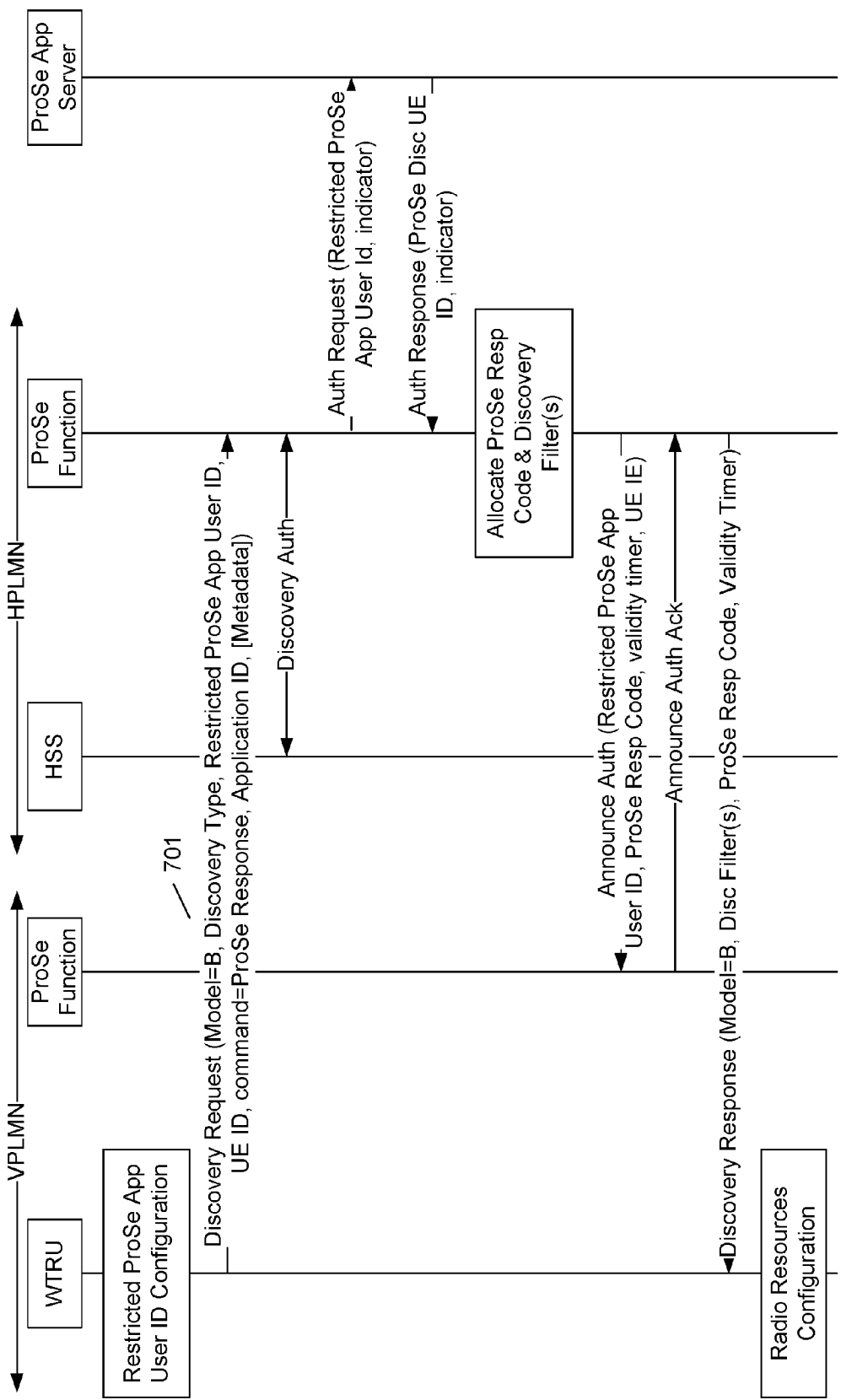
FIG. 7 is a message flow diagram illustrating example procedures for use in connection with inter-ProSe function metadata transfer.
Figure 8:
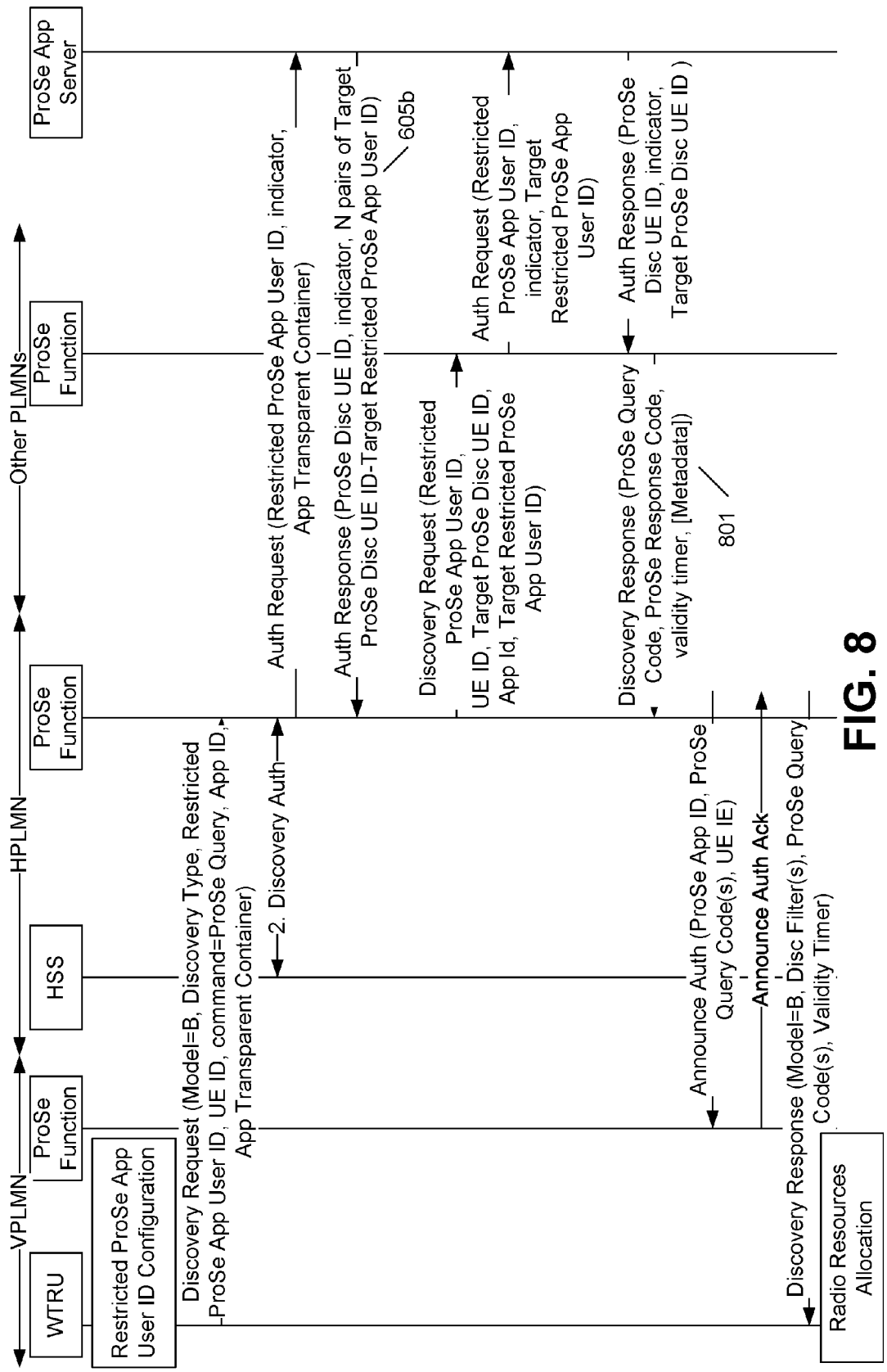
FIG. 8 is a message flow diagram illustrating example procedures for use in connection with inter-ProSe function metadata transfer.
Figure 9:
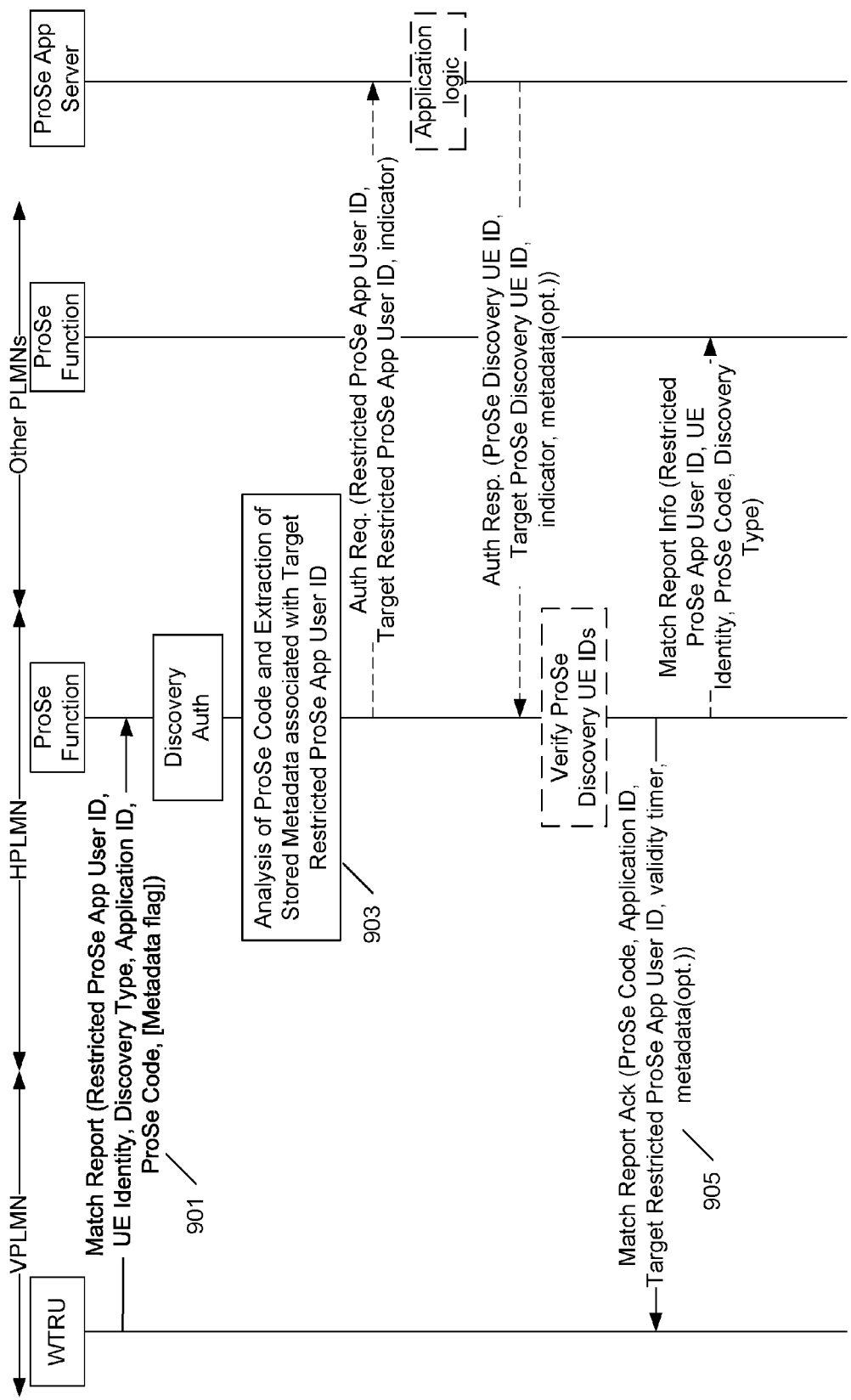
FIG. 9 is message flow diagram illustrating example procedures for use in connection with inter-ProSe function metadata transfer.

FIGS. 7, 8 and 9 are message flow diagrams illustrating example procedures for use in connection with inter-ProSe function metadata transfer that may be carried out via Discoveree WTRU request procedure, Discoveree WTRU request procedure and direct-communication procedure phases of a ProSe direct discovery procedure. FIG. 7 illustrates an example Discoveree WTRU request procedure. As part of the Discoveree WTRU request procedure, a Discoveree WTRU may send to a Discoveree (H)ProSe function a discovery request message that may include metadata and/or other information (701). Referring now to FIG. 8, an example Discoverer WTRU request procedure is illustrated. As part of the Discoverer WTRU request procedure, the Discoverer (H)ProSe function may acquire the metadata together with allocated ProSe query and response codes in a Discovery response message from the Discoveree (H)ProSe function (801). The Discoverer (H)ProSe function may store the acquired metadata in storage.

Referring now to FIG. 9, an example match report procedure is illustrated. As part of the example match report procedure, the Discoverer WTRU may send to the Discoverer (H)ProSe function a match report message (901) including a metadata flag (which metadata flag is included to signal that the Discoverer WTRU desires to receive the stored metadata). The Discoverer (H)ProSe function may extract the metadata from storage (903). The Discoverer (H)ProSe function may send the extracted metadata to the Discoverer WTRU in a match report acknowledgement message (905).

Example Metadata Transfers to Discoveree WTRU

Figure 10:
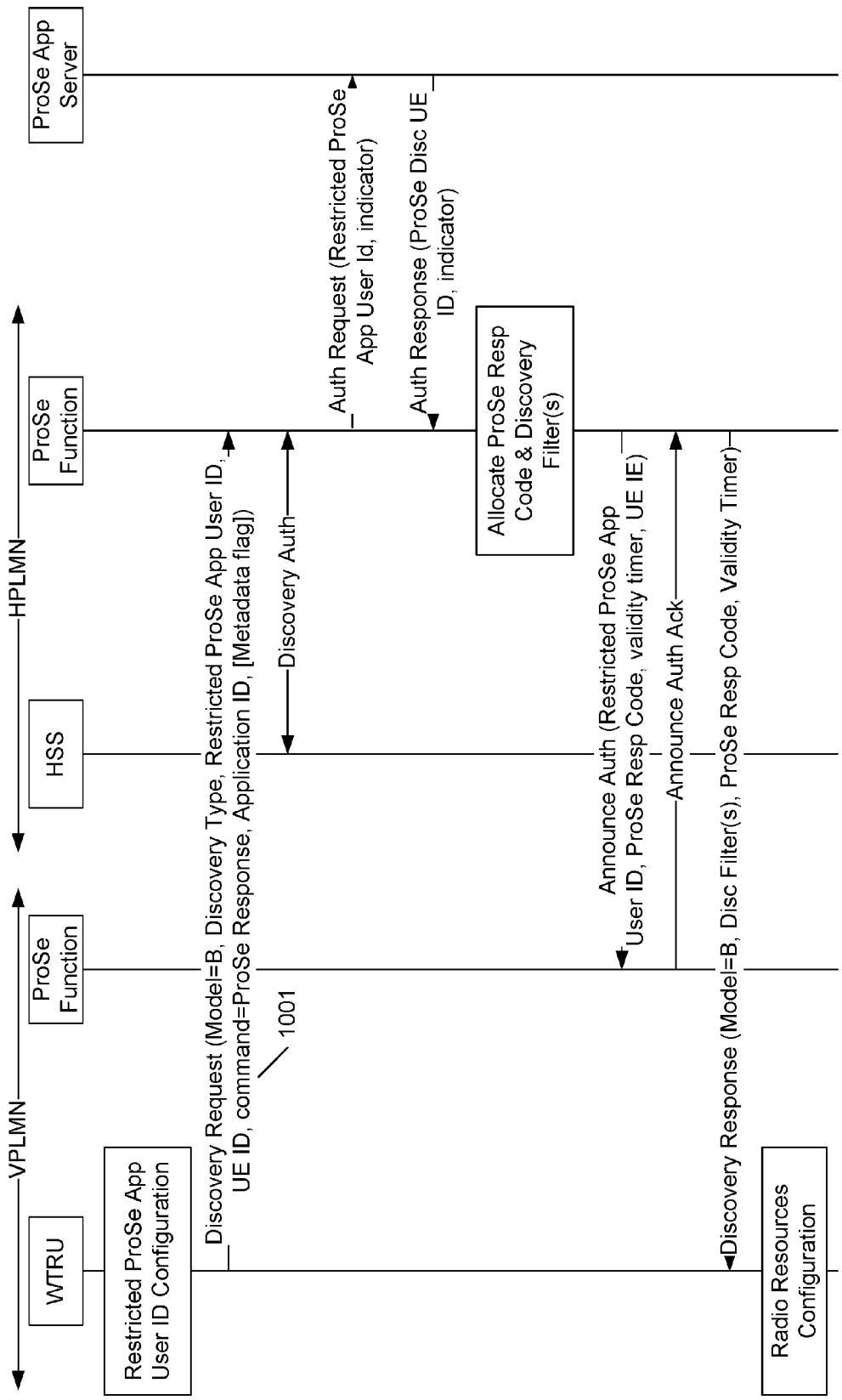
FIG. 10 is message flow diagrams illustrating example procedures for use in connection with metadata transfer.
Figure 11:
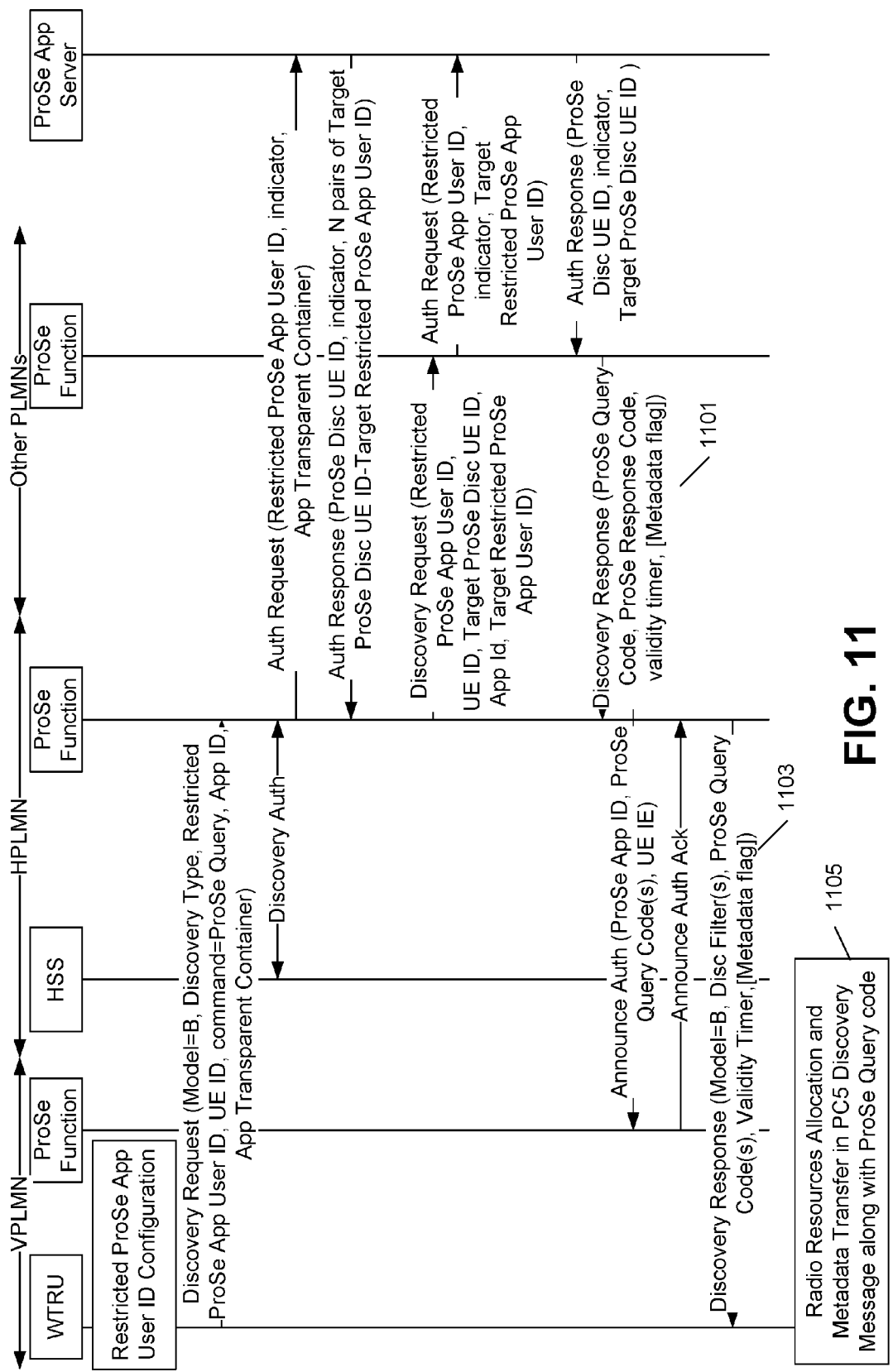
FIG. 11 is a message flow diagram illustrating an example procedure for use in connection with metadata transfer.

Metadata Flag in Discovery Request/Response along with Discoveree-to-Discoverer Direct Metadata Transfer FIGS. 10 and 11 are message flow diagrams illustrating example procedures for use in connection with metadata transfer that may be carried out via Discoveree WTRU request procedure, Discoveree WTRU request procedure and direct-communication procedure phases of a ProSe direct discovery procedure. FIG. 10 illustrates example Discoveree WTRU request procedure. As part of the Discoveree WTRU request procedure, a Discoveree WTRU may send to a Discoveree (H)ProSe function a discovery request message that may include a metadata flag so as to signal that the Discoveree WTRU desires to receive metadata from a Discoverer WTRU (1001). Referring now to FIG. 11, an example Discoverer discovery request procedure is illustrated. As part of the Discoverer discovery request procedure, the Discoverer (H)ProSe function may receive from the Discoveree (H)ProSe function a Discovery response message including the metadata flag together with allocated ProSe query and ProSe response codes (1101). The Discoverer WTRU may receive from the Discoverer (H)ProSe function a Discovery response message including the metadata flag and the ProSe query code (1103). Recognizing the metadata flag as a Discoveree request for metadata, the Discoverer WTRU can proceed with appending or otherwise including the metadata in a discovery message while announcing the ProSe query code over the air (1105).

Because the WTRUs may continue to announce their codes prior to expiry of their corresponding validity timers, the foregoing procedure offers the flexibility of allowing the Discoverer WTRU to dynamically revise, update, replace, delete, remove, etc. the metadata at any time. Additionally, the Discoveree WTRU may decide (at some point) that it does not desire to continue acquiring metadata. To effect this, the Discoveree WTRU may not include the metadata flag in further discovery messages. Alternatively, the Discoveree WTRU may set the metadata flag to a value indicating a desire not to acquire the metadata.

Figure 12:
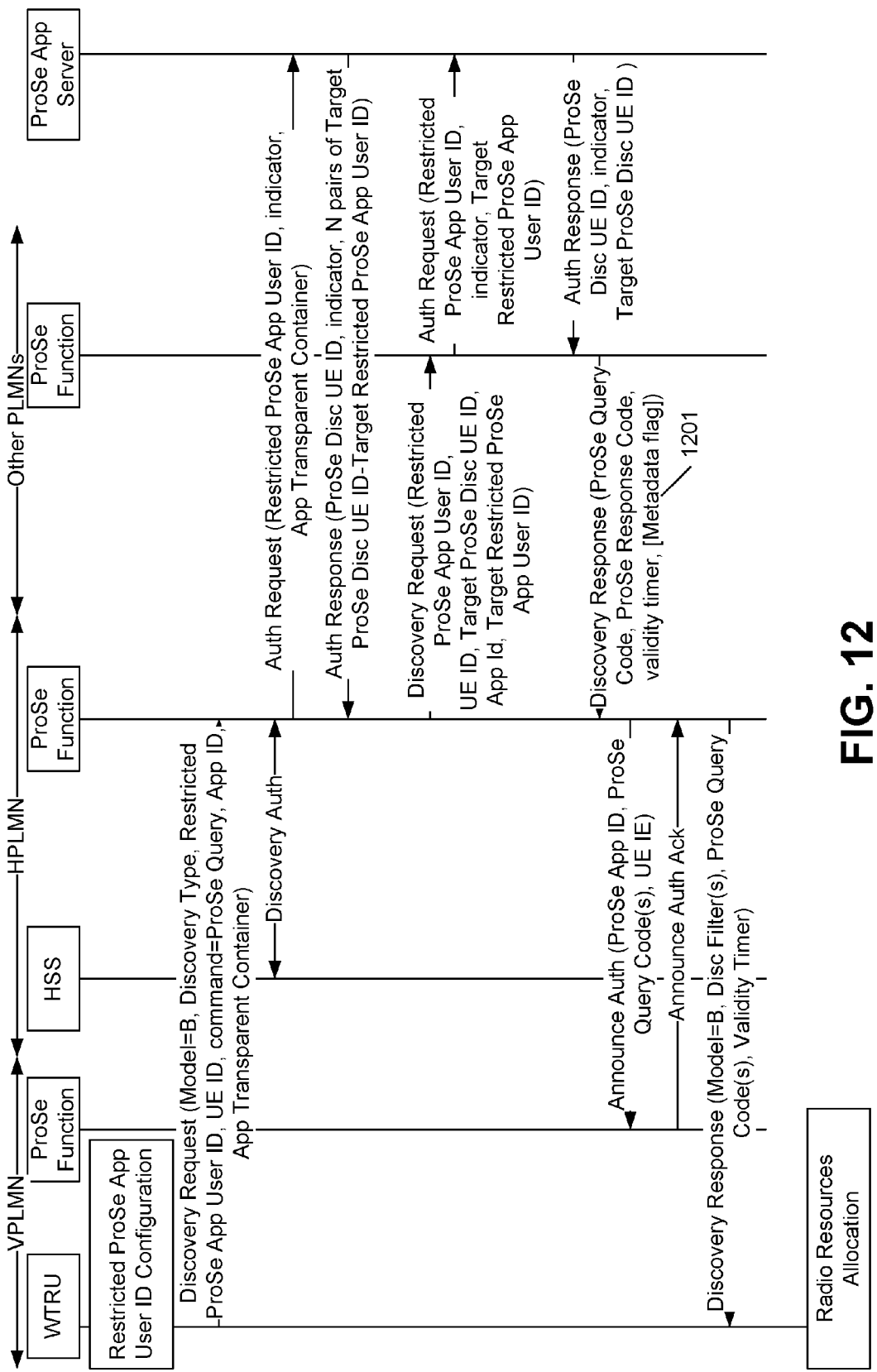
FIG. 12 is a message flow diagram illustrating an example procedure for use in connection with metadata transfer.
Figure 13:
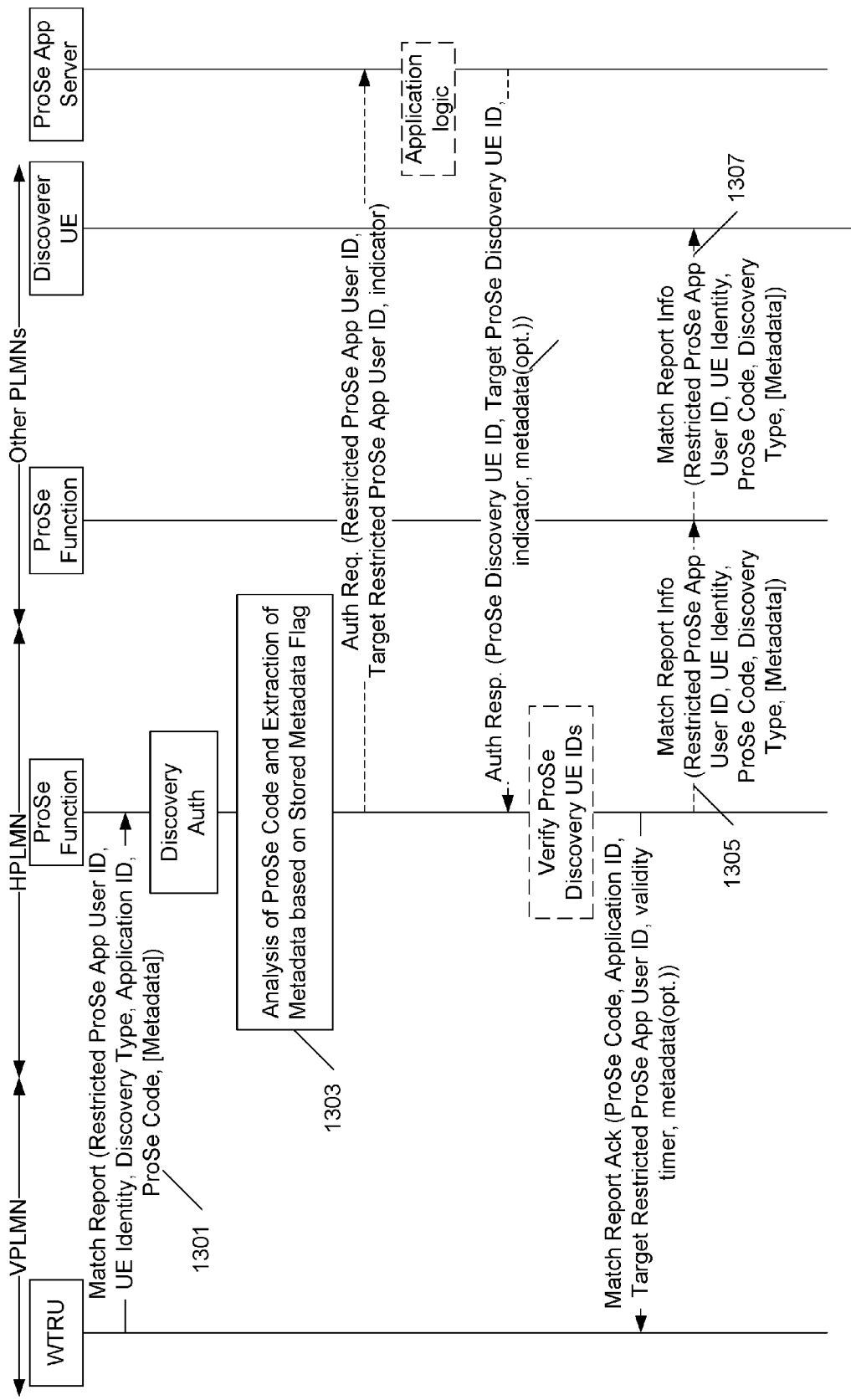
FIG. 13 is a message flow diagram illustrating an example procedure for use in connection with metadata transfer.

Example Metadata Flag in Discovery Request to ProSe Functions and Match Report Metadata Forwarding Procedures FIGS. 10, 12 and 13 are message flow diagrams illustrating example procedures for use in connection with metadata transfer that may be carried out via Discoveree WTRU request procedure, Discoveree WTRU request procedure and direct-communication procedure phases of a ProSe direct discovery procedure. Referring again to FIG. 10, as part of the Discoveree WTRU request procedure, a Discoveree WTRU may send to a Discoveree (H)ProSe function a discovery request message that may include a metadata flag so as to signal that the Discoveree WTRU desires to receive metadata from a Discoverer WTRU (1001). FIG. 12 illustrates an example Discoverer discovery request procedure. As part of the Discoverer discovery request procedure, the Discoverer (H)ProSe function may receive from the Discoveree (H)ProSe function a Discovery response message including the metadata flag together with allocated ProSe query and ProSe response codes (1201). The metadata flag remains intact in Discoverer (H)ProSe function. This way, when the Discoverer WTRU sends the metadata in a match report message to the Discoverer (H)ProSe function (1301, FIG. 13), the Discoverer (H)ProSe function may check for the presence of the metadata flag, and if present, the metadata may be extracted at the Discoverer (H)ProSe function (1303, FIG. 13). The Discoverer (H)ProSe function, thereafter, may pass the match report information including the metadata with the Discoveree (H)ProSe function (1305, FIG. 13), which in turn, may push or otherwise provide the metadata to the Discoveree (1307, FIG. 13).

Figure 14:
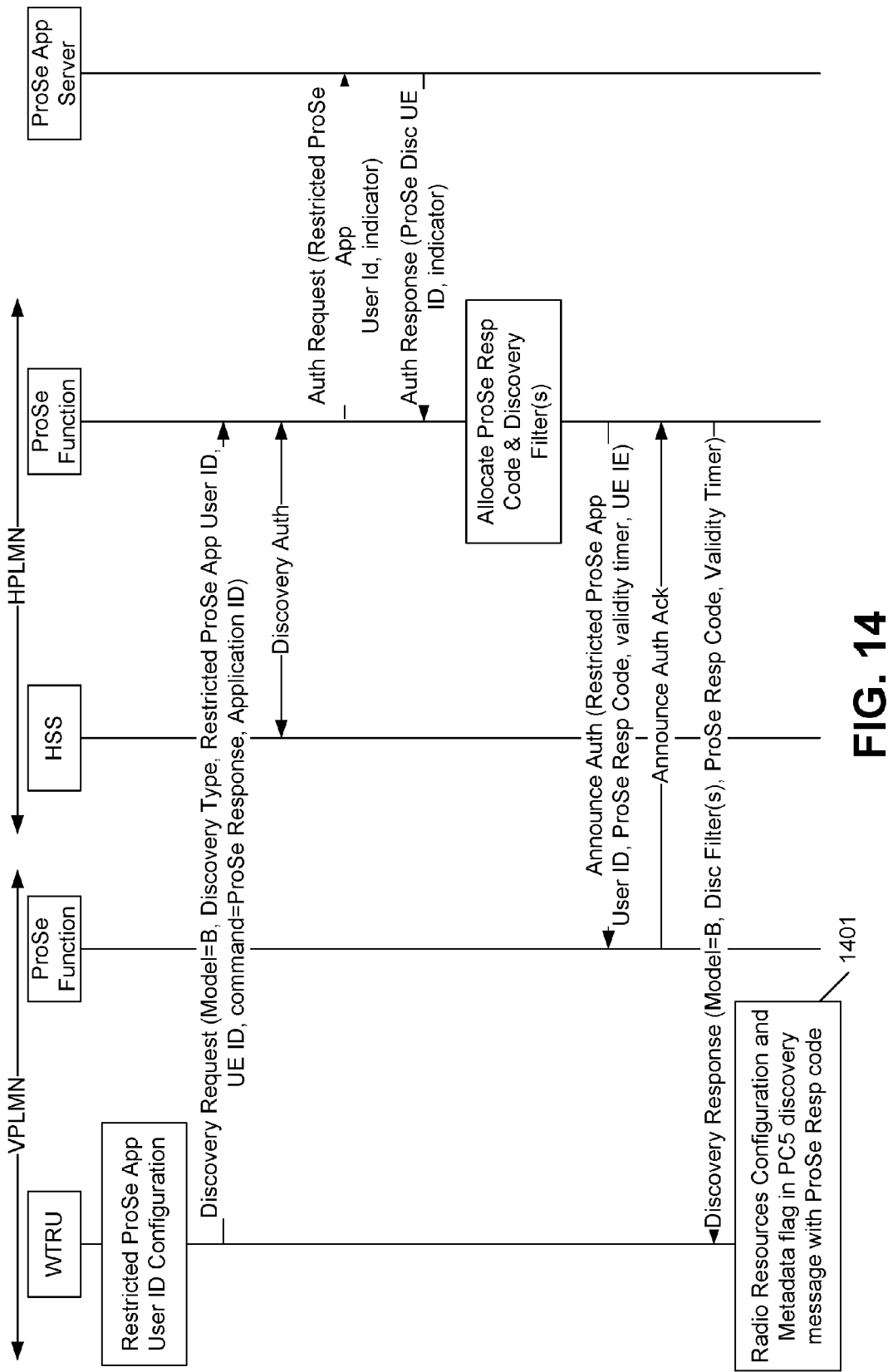
FIG. 14 is a message flow diagram illustrating an example procedure for use in connection with metadata transfer.
Figure 15:
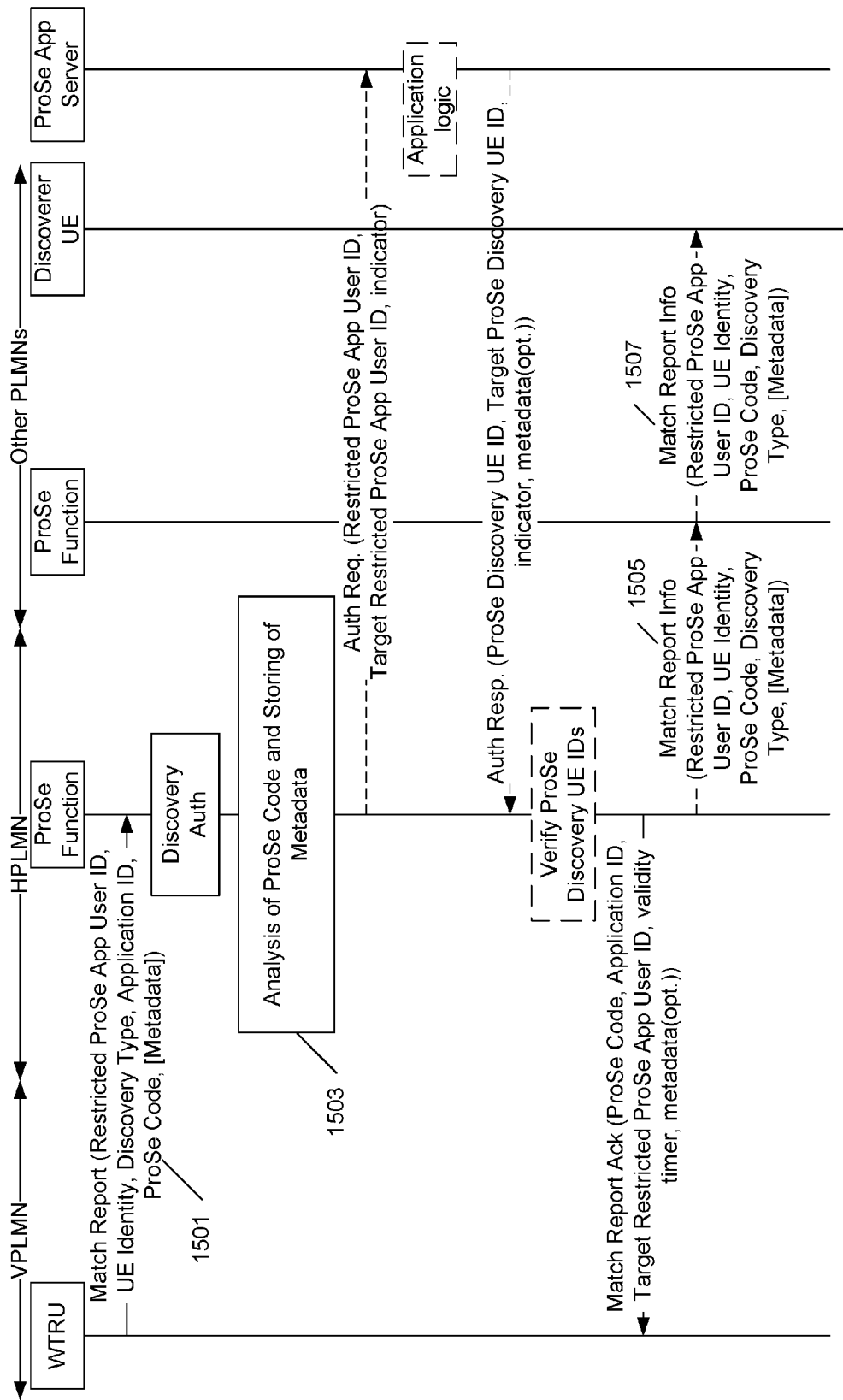
FIG. 15 is a message flow diagram illustrating an example procedure for use in connection with requesting application controlled suffix information.

Discoveree-to-Discoverer Direct Metadata Flag Transfer and Match Report Information Forward FIGS. 14 and 15 are message flow diagrams illustrating example procedures for use in connection with metadata transfer that may be carried out via Discoveree WTRU request procedure, Discoveree WTRU request procedure and direct-communication procedure phases of a ProSe direct discovery procedure. FIG. 14 illustrates a direct-communication procedure. As part of the direct-communication procedure, a Discoveree WTRU may send over the air a discovery message (e.g., a PC5 discovery message) including a metadata flag along with a ProSe response code (1401). When the Discoverer WTRU monitors for the ProSe response code using its discovery filter and notices the metadata flag, the Discoverer WTRU can then decide to include metadata information in a match report message to the Discoverer (H)ProSe function (1501, FIG. 15). The Discoverer (H)ProSe function may store the metadata (1503). The Discoverer (H)ProSe function may push or otherwise send the metadata to the Discoveree (H)ProSe function (1505), which in turn, may push or otherwise provide the metadata to the Discoveree (1507).

Multi-Level Metadata Classification and Indication

One possible refinement is to classify metadata into various levels/classes (e.g., 'short' versus 'long' metadata in case of two Metadata levels/classes) depending on information type. This way, a requesting WTRU may pledge for a specific metadata level/class according to its needs. To facilitate this, an application server may define different metadata levels/classes together with their corresponding compositions (i.e., which metadata information type or component belongs to which metadata level/class) and possibly represent those classes/levels with different indices (e.g., 1 bit to distinguish between 'short' and 'long' metadata). In a simple case of two metadata levels/classes, the metadata information types or components may be sorted according to (and among) the 'short' and 'long' metadata classes/levels.

A WTRU may learn the metadata classification from the application server over PC1 via application level signaling. After an application client at the WTRU becomes acquainted with the metadata classification, an application layer in WTRU can know (or determine) which metadata level/class it wants to obtain, and may pass an associated index or other indicator of that desired metadata level/class ("metadata-level/class indicator") to a ProSe layer in the WTRU. The ProSe protocol may then signal and append or otherwise combine the metadata-level/class indicator to the metadata flag so that only the requested metadata level/class is fetched from a target WTRU. In other words, the requesting WTRU may include metadata-level/class indicator along with the metadata flag so as to specify what level or granularity of metadata it is interested in obtaining. When the peer WTRU realizes that the metadata-level/class indicator is for a specific metadata level/class, the ProSe layer at that WTRU may check with the application client to extract the appropriate information pertaining to that level and send such information back. Advantageously, this multi-level metadata approach may be applicable to all metadata transfers describe herein, regardless of whether the requesting WTRU is a Discoverer or a Discoveree.

Example ProSe Code Application Suffix for Model B Discovery

Allocation of application Level suffix in Model B discovery may be different from the current Model A procedure because ProSe codes are announced by both Discoveree and Discoverer. The ProSe code suffix may also be announced by both a Discoveree and a Discoverer. The Discoverer may announce ProSe query code with suffix resulting in a ProSe response code with suffix from the Discoveree.

In Model B application controlled discovery procedure, each of the Discoverer ProSe function and the Discoveree ProSe function may obtain masks for ProSe code suffixes from the ProSe App server. The Discoveree ProSe function may receive a pool of ProSe code suffixes ("ProSe code suffix pool") directly from the ProSe application server. The Discoverer ProSe function may receive the ProSe code suffix pool from the Discoveree ProSe function.

Discoveree Request Procedure

Figure 16:
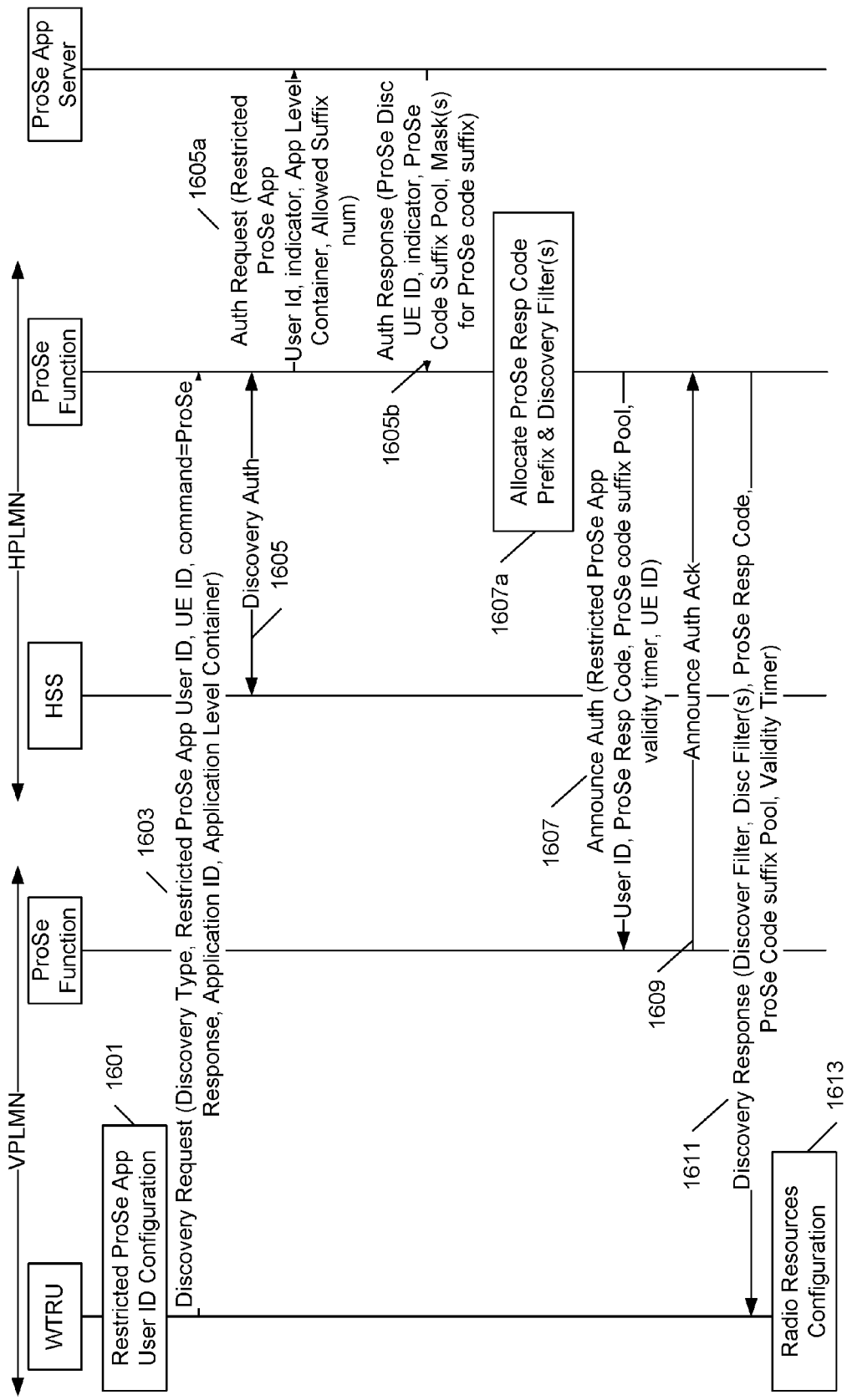
FIG. 16 is a message flow diagram illustrating an example procedure for use in connection with requesting application controlled suffix information.

FIG. 16 is a message flow diagram illustrating a Discoveree discovery request procedure for application controlled suffix extension. For simplicity of exposition, the procedure of FIG. 16 is described with reference to the ProSe architecture of FIG. 2. The example procedure of FIG. 16 may be carried out in other architectures, as well.

Prior to 1605*b*, a ProSe App server may allocate a ProSe code suffix pool along with ProSe Mask(s) for monitoring for one or more of the ProSe code suffixes. The ProSe code Prefix (allocated by the ProSe function) and ProSe code suffix pool may be sent to the Discoveree. If the ProSe Mask(s) are allocated by the ProSe App server, discovery filter(s) sent to the Discoveree may also include the ProSe Mask(s).

After receiving configuration information, a WTRU may send a discovery request for Model B discovery with application controlled extension by specifying the same in a discovery type field include in the discovery request message (1603). The discovery request message may also include a new application level container that includes information corresponding to the ProSe code suffix (e.g., user information, group information etc.).

The Discoveree ProSe function may authorize the request with an HSS (1605). At ref. 1605*a*, Discoveree ProSe function may perform ProSe App server authorization, including sending an authorization request message that may include the new application level container. The authorization request message may also include an allowed suffix number parameter. This allowed suffix number parameter may assist the ProSe App server to build the ProSe code suffix and may be set by the ProSe function based on operator policy. After receiving this information, the ProSe App server may send an authorization response message that may include the ProSe code suffix pool and masks for ProSe code suffixes (1605*b*). The suffix masks may be used by the ProSe function to provide to the Discoveree discovery filters for monitoring the ProSe query code with suffix extension.

The ProSe response code and ProSe code suffix pool is sent to the Discoveree, along with the discovery filters (which may include mask(s) for ProSe Suffix) (1611). In a roaming scenario (i.e., the Discoveree is registered in a VPLMN), an Announce Authorization procedure may be carried with a Discoveree ProSe function of the VPLMN ("Discoveree (V)ProSe function"). During the Announce Authorization procedure, the Discoveree (H)ProSe function may send to the Discoveree (V)ProSe function an Announce Authorization message including the ProSe code suffix pool.

Example Discoverer UE Request Procedure

Figure 17:
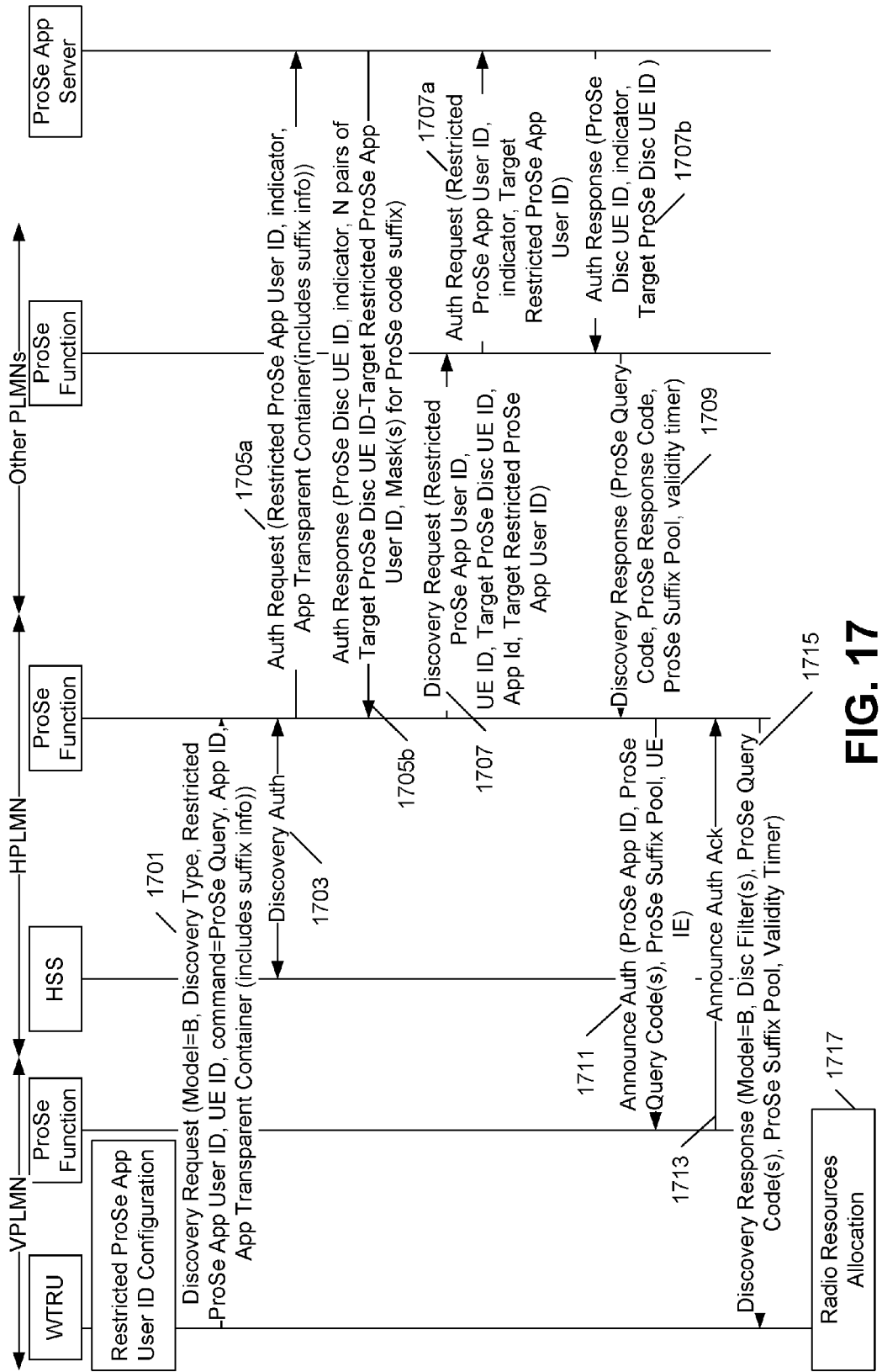
FIG. 17 is a message flow diagram illustrating a Discoverer discovery request procedure.

FIG. 17 is a message flow diagram illustrating a Discoverer discovery request procedure. For simplicity of exposition, the procedure of FIG. 17 is described with reference to the ProSe architecture of FIG. 2. The example procedure of FIG. 17 may be carried out in other architectures, as well.

A Discoverer ProSe function may obtain ProSe code suffix mask(s) from a ProSe App server during an application authorization stage if suffix information is included in the request message. Since in model B discovery, codes are allocated by the Discoveree ProSe function, the ProSe code suffix may be obtained by a Discoverer ProSe function as described below. Both ProSe suffix code and ProSe suffix mask(s) may be used by the ProSe function to create discovery filter(s) sent to the WTRU in the Discovery response message.

As described above, in Model B application controlled discovery procedure, the Discoverer ProSe function and the Discoveree ProSe function obtain the masks for the suffixes from the ProSe App server. The Discoveree ProSe function may receive the ProSe code suffix pool directly from the ProSe App server, and the Discoverer ProSe function may receive the ProSe code suffix pool from the Discoveree ProSe function.

The Discoveree WTRU may specify "Model B discovery with application controlled extension" in the Discovery Type field of the Discovery Request message (1701). The application level container may include information related to ProSe suffix code.

After receiving configuration information, the Discoveree WTRU may send a discovery request for Model B discovery with application controlled extension by specifying the same in a discovery type field include in the discovery request message (1701). The discovery request message may also include a new application level container that includes information corresponding to the ProSe code suffix (e.g., user information, group information etc.).

This request may be authorized by an HSS and the ProSe App by the Discoveree (H)ProSe function. The Authorization request message to the ProSe App server may include information corresponding to the application suffix, and the application server may include ProSe Mask(s) for suffix code in an Authorization response message. Note that ProSe App server does not include ProSe Suffix codes (as in the case of a Discoveree request) because allowed suffix number parameter is not included in the Authorization request message.

If the Discoverer ProSe function and the Discoveree ProSe function are different, a discovery Request may be sent to the Discoveree ProSe function (1703). After an optional application authorization (1705*a*, 1705*b*), the Discoveree ProSe function may responds with a ProSe query code, a ProSe response code and a ProSe code suffix pool. The Discoveree ProSe function may have earlier received the ProSe code suffix pool (1705*a*).

The ProSe response code and ProSe code suffix pool may be sent to the Discoveree WTRU (1717) along with discovery filters (which may include mask(s) for ProSe Suffix received by the ProSe function (1705*b*). In a roaming scenario (i.e., the Discoveree WTRU is registered in a VPLMN), an Announce Authorization procedure may be carried with a Discoveree (V)ProSe function. During the Announce Authorization procedure, the Discoveree (H)ProSe function may send to the Discoveree (V)ProSe function an Announce Authorization message including the ProSe code suffix pool.

Example ProSe Code Validity Timer Management Procedures and Architecture

A Discoverer (or other monitoring WTRU) may need to refresh its match reports notwithstanding that validity timers for ProSe codes associated with such reports have not expired. Various reasons exist for refreshing match reports, including, for example, security requirements (e.g., to prevent or at least limit replay attacks). To facilitate this, in one embodiment, a match report refresh timer is provided to the Discoverer (or other monitoring WTRU) during a direct discovery procedure. An example of the match report refresh timer may be found in 3GPP Technical Document No. C1-151342, which is incorporated herein by reference.

The match report refresh timer may be used the Discoverer (or other monitoring WTRU) to determine whether to send a new match report request message to a ProSe function to validate the ProSe code (ProSe application code) it previously received. If, for example, the match report refresh timer expires prior to expiry of the validity timer of such ProSe code, then the Discoverer (or other monitoring WTRU) may determine to send, and in turn, may send the new match report request message to the ProSe function to initiate (i) a refresh of the corresponding match report or (ii) a new match report procedure.

In some instances, the ProSe function may reject the new match report request for various reasons, such as invalid MIC value, wrong UTC timer, etc. In such instances, the ProSe function may send a match report reject message to the Discoverer (or other monitoring WTRU). Possible consequences of rejecting the new match report request are (i) the validity timer may continue to run at the Discoverer (or other monitoring WTRU) and (ii) upper layers in the Discoverer (or other monitoring WTRU) may assume that the ProSe code (ProSe application code) is still valid.

The Discoverer (or other monitoring WTRU) may stop the validity timer and/or inform the upper layers that the ProSe code (ProSe application code) is no longer valid responsive to a match report reject message from the ProSe function. The Discoverer (or other monitoring WTRU) may send a new match report request or discovery request for monitoring thereafter, e.g., at a next match event.

As an alternative, the Discoverer (or other monitoring WTRU) may send additional match report requests up to some number N times (e.g., 3 or 5 retries). If none of the additional match report request are successful (or all are rejected) prior to expiry of the validity timer, the Discoverer (or other monitoring WTRU) may stop validity timer/or and inform the upper layers that the ProSe code (ProSe application code) is no longer valid.

Conclusion

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, the term "video" may mean any of a snapshot, single image and/or multiple images displayed over a time basis. As another example, when referred to herein, the terms "user equipment" and its abbreviation "UE" may mean (i) a wireless transmit and/or receive unit (WTRU), such as described supra; (ii) any of a number of embodiments of a WTRU, such as described supra; (iii) a wireless-capable and/or wired-capable (e.g., tetherable) device configured with, inter alia, some or all structures and functionality of a WTRU, such as described supra; (iii) a wireless-capable and/or wired-capable device configured with less than all structures and functionality of a WTRU, such as described supra; or (iv) the like. Details of an example WTRU, which may be representative of any UE recited herein, are provided above with respect to FIGS. 1A-1E.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit (CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. §112, ¶6 or means-plus-function claim format, and any claim without the terms "means for" is not so intended.

What is claimed is:

1. A method implemented in a first proximity services (ProSe) function serving a discoverer user equipment (UE), the method comprising:
    receiving, from the discoverer UE, a first discovery request message including a ProSe application identifier and an indication indicating Model B discovery;
    transmitting, to a second ProSe function configured to serve a discoveree UE, a second discovery request message requesting a ProSe application code corresponding to the ProSe application identifier;
    determining that no valid ProSe application code corresponding to the ProSe application identifier is available based on any of:
        not receiving a response to the second discovery request message;
        not receiving any valid ProSe application code corresponding to the ProSe application identifier in response to the second discovery request message; and
        receiving, in response to the second discovery request message, an indication indicating that no valid ProSe application code corresponding to the ProSe application identifier is available; and
    transmitting, to the discoverer UE, a reject-type discovery response message.

2. The method of claim 1, wherein the reject-type discovery response message comprises a cause indication/value.

3. The method of claim 2, wherein the cause indication/value is an indication of "No valid Discovery Filters" or "No valid ProSe code available".

4. The method of claim 1, wherein not receiving a response to the second discovery request message comprises not timely receiving a response to the second discovery request message.

5. The method of claim 1, wherein not receiving any valid ProSe application code corresponding to the ProSe application identifier in response to the second discovery request message comprises not timely receiving any valid ProSe application code corresponding to the ProSe application identifier in response to the second discovery request message.

6. The method of claim 1, wherein the first discovery request message is a monitoring type discovery request message.

7. A first proximity services (ProSe) function configured to serve a discoverer user equipment (UE), the first ProSe function comprising circuitry, including a processor and instructions executable by the processor, configured to:
receive, from the discoverer UE, a first discovery request message including a ProSe application identifier and an indication indicating Model B discovery;
transmit, to a second ProSe function configured to serve a discoveree UE, a second discovery request message requesting a ProSe application code corresponding to the ProSe application identifier;
determine that no valid ProSe application code corresponding to the ProSe application identifier is available based on any of:
not receiving a response to the second discovery request message;
not receiving any valid ProSe application code corresponding to the ProSe application identifier in response to the second discovery request message; and
receiving, in response to the second discovery request message, an indication indicating that no valid ProSe application code corresponding to the ProSe application identifier is available; and
transmit, to the discoverer UE, a reject-type discovery response message.

8. The first ProSe function of claim 7, wherein the reject-type discovery response message comprises a cause indication/value.

9. The first ProSe function of claim 8, wherein the cause indication/value is an indication of "No valid Discovery Filters" or "No valid ProSe code available".

10. The first ProSe function of claim 7, wherein not receiving a response to the second discovery request message comprises not timely receiving a response to the second discovery request message.

11. The first ProSe function of claim 7, wherein not receiving any valid ProSe application code corresponding to the ProSe application identifier in response to the second discovery request message comprises not timely receiving any valid ProSe application code corresponding to the ProSe application identifier in response to the second discovery request message.

12. A method implemented in a wireless transmit/receive unit (WTRU) participating in a proximity services (ProSe) direct discovery procedure, the method comprising:
sending a match report request message to a ProSe function after expiry of a match report refresh timer and prior to expiry of a validity timer of a ProSe code;
receiving a match report reject message from the ProSe function; and
stopping the validity timer responsive to the match report reject message.

13. The method of claim 12, further comprising: informing upper layers of the WTRU that the ProSe code is no longer valid.

14. The method of claim 12, wherein the match report reject message comprises a cause value indicating an invalid MIC.

15. A wireless transmit/receive unit (WTRU) configured to participate in a proximity services (ProSe) direct discovery procedure, the WTRU comprising a transmitter, a receiver, a processor, a match report refresh timer and a validity timer of a proximity services (ProSe) code, wherein:
the processor in combination with the transmitter is configured to send a match report request message to a ProSe function after expiry of the match report refresh timer and prior to expiry of the validity timer of a ProSe code;
the receiver is configured to receive a match report reject message from the ProSe function; and
the processor is configured to stop the validity timer responsive to the match report reject message.

16. The WTRU of claim 15, wherein the processor is configured to inform upper layers of the WTRU that the ProSe code is no longer valid.

17. The WTRU of claim 15, wherein the match report reject message comprises a cause value indicating an invalid MIC.

18. A method implemented in a proximity services (ProSe) function, the method comprising:
receiving a match report request message from a wireless transmit/receive unit (WTRU) after expiry of a match report refresh timer and prior to expiry of a validity timer of a ProSe code; and
transmitting a match report reject message to the WTRU.

19. The method of claim 18, wherein the match report reject message comprises a cause value indicating an invalid MIC.

20. A proximity services (ProSe) function comprising circuitry, including a processor and instructions executable by the processor, configured to:
receive a match report request message from a wireless transmit/receive unit (WTRU) after expiry of a match report refresh timer and prior to expiry of a validity timer of a ProSe code; and
transmit a match report reject message to the WTRU.

21. The ProSe function of claim 20, wherein the match report reject message comprises a cause value indicating an invalid MIC.

22. A method implemented in a first proximity services (ProSe) function configured to serve a discoveree user equipment (UE), the method comprising:
receiving, from a second ProSe function engaged in Model B discovery with a discoverer UE, a discovery request message requesting a ProSe application code corresponding to a ProSe application identifier associated with the discoverer UE;
determining whether a valid ProSe application code corresponding to the ProSe application identifier is available to the first ProSe function; and
on condition that a valid ProSe application code corresponding to the ProSe application identifier is not available to the first ProSe function:
not responding to the discovery request message; or
transmitting, to the second ProSe function, a response to the discovery request message including an indication indicating that no valid ProSe application code corresponding to the ProSe application identifier is available.

23. The method of claim 22, further comprising: transmitting a second reject-type discovery response message to a WTRU.

24. The method of claim 23, wherein the second reject-type discovery response message comprises a cause indication/value.

25. The method of claim 24, wherein the cause indication/value is an indication of "No valid Discovery Filters" or "No valid ProSe code available".

26. The method of claim 22, wherein the indication is a lack of any valid ProSe application code corresponding to the ProSe application identifier being included in the response.

27. The method of claim 22, wherein the indication is an explicit indication indicating that no valid ProSe application code corresponding to the ProSe application identifier is available.

28. The method of claim 22, wherein the discovery request message is a monitoring type discovery request message.

29. The first ProSe function of claim 22, wherein the discovery request message is a monitoring type discovery request message.

30. A first proximity services (ProSe) function configured to serve a discoveree user equipment (UE), the first ProSe function comprising circuitry, including a processor and instructions executable by the processor, configured to:
    receive, from a second ProSe function engaged in Model B discovery with a discoverer UE, a discovery request message requesting a ProSe application code corresponding to a ProSe application identifier associated with the discoverer UE;
    determine whether a valid ProSe application code corresponding to the ProSe application identifier is available to the first ProSe function; and
    on condition that a valid ProSe application code corresponding to the ProSe application identifier is not available to the first ProSe function:
        not respond to the discovery request message; or
        transmit, to the second ProSe function, a response to the discovery request message including an indication indicating that no valid ProSe application code corresponding to the ProSe application identifier is available.

31. The first ProSe function of claim 30, wherein the response is a reject-type discovery response message.

32. The first ProSe function of claim 31, wherein the reject-type discovery response message comprises a cause indication/value.

33. The first ProSe function of claim 32, wherein the cause indication/value is an indication of "No valid Discovery Filters" or "No valid ProSe code available".

34. The first ProSe function of claim 30, wherein the discovery request message is a monitoring type discovery request message.

35. The first ProSe function of claim 30, wherein the indication is a lack of any valid ProSe application code corresponding to the ProSe application identifier being included in the response.

36. The first ProSe function of claim 30, wherein the indication is an explicit indication indicating that no valid ProSe application code corresponding to the ProSe application identifier is available.

* * * * *